(12) United States Patent
Hisano et al.

(10) Patent No.: US 10,454,660 B2
(45) Date of Patent: Oct. 22, 2019

(54) TRANSMISSION SYSTEM, TRANSMISSION METHOD AND TRANSMISSION DEVICE

(71) Applicant: NIPPON TELEGRAPH AND TELEPHONE CORPORATION, Tokyo (JP)

(72) Inventors: Daisuke Hisano, Yokosuka (JP); Tatsuya Shimada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/763,278

(22) PCT Filed: Oct. 4, 2016

(86) PCT No.: PCT/JP2016/079411
§ 371 (c)(1),
(2) Date: Mar. 26, 2018

(87) PCT Pub. No.: WO2017/061407
PCT Pub. Date: Apr. 13, 2017

(65) Prior Publication Data
US 2018/0287769 A1 Oct. 4, 2018

(30) Foreign Application Priority Data

Oct. 8, 2015 (JP) .................. 2015-200372

(51) Int. Cl.
*H04L 5/14* (2006.01)
*H04L 12/44* (2006.01)
(Continued)

(52) U.S. Cl.
CPC ........... *H04L 5/14* (2013.01); *H04B 7/15528* (2013.01); *H04B 10/27* (2013.01); *H04J 14/02* (2013.01);
(Continued)

(58) Field of Classification Search
CPC ....... H04L 5/14; H04L 5/0008; H04L 5/0064; H04L 5/0087; H04L 5/1469; H04L 12/44;
(Continued)

(56) References Cited

U.S. PATENT DOCUMENTS 9,491,075 B2 * 11/2016 Lee ..................... H04L 43/0852
9,866,327 B2 * 1/2018 Shibata ............ H04B 10/25754
(Continued)

FOREIGN PATENT DOCUMENTS

| JP | 2010-068067 A | 3/2010 |
| JP | 2015-076761 A | 4/2015 |

(Continued)

OTHER PUBLICATIONS

"NTT Technical Journal, Technology Basic Course [GE-PON Technology], Part 1:PON", [online], 2005, Nippon Telegraph and Telephone Corporation, [accessed May 21, 2015], Internet <URL http://www.ntt.co.jp/journal/0508/files/jn200508071.pdf> with partial translation thereof.

(Continued)

Primary Examiner — Afsar M Qureshi
(74) Attorney, Agent, or Firm — Harness, Dickey & Pierce, P.L.C.

(57) ABSTRACT

A transmission system for performing communication according to time division duplex (TDD), includes a relay unit configured to relay uplink signals and downlink signals in the first and second communication systems, a TDD information estimation unit configured to estimate a transmission stop period during which no uplink signal of the first communication system is transmitted, an estimation error detection unit configured to detect that the estimation of the transmission stop period is erroneous on the basis of the uplink signal or the downlink signal of the first communication system, and a bandwidth allocation unit configured to (Continued)

prioritize allocation of a bandwidth in the relay unit for the uplink signal of the first communication system over allocation of a bandwidth in the relay unit for the uplink signal of the second communication system if the estimation of the transmission stop period is erroneous.

7 Claims, 17 Drawing Sheets

(51) Int. Cl.
H04W 72/10 (2009.01)
H04B 7/155 (2006.01)
H04L 5/00 (2006.01)
H04B 10/27 (2013.01)
H04J 14/02 (2006.01)

(52) U.S. Cl.
CPC .......... *H04L 5/0008* (2013.01); *H04L 5/0064* (2013.01); *H04L 5/0087* (2013.01); *H04L 5/1469* (2013.01); *H04L 12/44* (2013.01); *H04W 72/10* (2013.01)

(58) Field of Classification Search
CPC .... H04W 72/10; H04J 14/02; H04B 7/15528; H04B 10/27
See application file for complete search history.

(56) References Cited

U.S. PATENT DOCUMENTS

| 2008/0145057 | A1 | 6/2008 | Lee et al. |
| 2009/0067448 | A1 | 3/2009 | Stanwood et al. |
| 2010/0061401 | A1 | 3/2010 | Nakahira |
| 2011/0103406 | A1 | 5/2011 | Cai et al. |
| 2015/0207712 | A1* | 7/2015 | Fang .................. H04L 43/106 370/252 |
| 2015/0215059 | A1 | 7/2015 | Kerpez et al. |
| 2015/0229397 | A1 | 8/2015 | Shibata et al. |
| 2017/0063486 | A1* | 3/2017 | Sarashina ........... H04J 14/0221 |

FOREIGN PATENT DOCUMENTS

| JP | 2015045697 | * | 4/2015 |
| WO | WO-2014/061552 A1 | | 4/2014 |

OTHER PUBLICATIONS

3GPP, "Evolved Universal Terrestrial Radio Access (E-UTRA) and Evolved Universal Terrestrial Radio Access Network (E-UTRAN); Overall description; Stage 2 (Release 12)", 3GPP TS 36.300 (V12.4.0), Dec. 2014 (5 Physical Layer for E-UTRA).
Hisano et al., A Study of Accommodation of Mobile and Other Systems in a PON system Using Mobile TDD Frame Estimation, IEICE Society Conference 2015, B-8-10, Sep. 2015 with partial translation thereof.
International Search Report for PCT/JP2016/079411, ISA/JP, Tokyo, dated Dec. 13, 2016 with English translation thereof.
European Search Report regarding EPSN 168535615, dated Apr. 4, 2019.
David Remondo et al., "Integration of Optical and Wireless Technologies in the Metro-Access: QoS Support and Mobility Aspects", Next Generation Internet Networks, 2009. NGI '09, IEEE, Piscataway, NJ, USA, Jul. 1, 2009, pp. 1-8.
Antonios G. Sarigiannidis et al., "Architectures and Bandwidth Allocation Schemes for Hybrid Wireless-Optical Networks", IEEE Communications Surveys & Tutorials, vol. 17, No. 1, Sep. 15, 2014, pp. 427-468.
Lin, Yanchao et al., "QoS Aware Dynamic Uplink-Downlink Reconfiguration Algorithm in TD-LTE HetNet", 2013 IEEE Globecom Workshops (GC WKSHPS), IEEE, Dec. 9, 2013, pp. 708-713. XP032599895, DOI: 10.1109/GLOCOMW.2013.6825071 [retrieved on Jun. 3, 2014].
Arokkiam, Jerome A.,"Refining the GIANT dynamic bandwidth allocation mechanism for XG-PON", 2015 IEEE International Conference on Communications (ICC), IEEE, Jun. 8, 2015, pp. 1006-1011, XP033198572. DOI: 10.1109/ICC.2015.7248454 [retrieved on Sep. 9, 2015].
Extended European Search Report regarding EPSN 168535615, dated Jul. 29, 2019.

* cited by examiner

| INDEX | SWITCHING CYCLE | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

D:DOWNLINK SUBFRAME
U:UPLINK SUBFRAME
S:SPECIAL SUBFRAME

TRANSMISSION SYSTEM, TRANSMISSION METHOD AND TRANSMISSION DEVICE

TECHNICAL FIELD

The present invention relates to a transmission system, a transmission method, and a transmission device.

This application is a 371 U.S. Nation Phase of PCT/JP2016/079411, filed on Oct. 4, 2016. Priority is claimed on Japanese Patent Application No. 2015-200372, filed Oct. 8, 2015, the contents of both of which are incorporated herein by reference.

BACKGROUND ART

In wireless communication systems, an antenna unit (RRH: Remote Radio Head) and a signal processing unit (BBU: Baseband Unit) of a wireless base station may be separate. The RRH and the BBU communicate via a mobile fronthaul.

FIG. 12 is a diagram showing an example of a configuration of a mobile fronthaul. In the mobile fronthaul, communication of a wavelength division multiplex (WDM) scheme is used. In the WDM scheme, a wavelength of light used in an uplink is different from a wavelength of light used in a downlink. The uplink is a link from a lower-order device that is a mobile wireless terminal or the like to a higher-order device that is a BBU or the like. The downlink is a link from the higher-order device to the lower-order device. By using the WDM scheme, the transmission system simultaneously transmits an uplink signal and a downlink signal via a single optical fiber (see Non-Patent Document 1).

The transmission system may relay a signal of a communication system based on a time division duplex (TDD) scheme according to a frequency division duplex (FDD) scheme. In the FDD scheme, different frequency bands are used for the uplink and the downlink. In the TDD scheme, the same frequency band is used for the uplink and the downlink. In the TDD scheme, the uplink signal and the downlink signal are switched on a time axis.

FIG. 13 is a diagram showing a configuration of a TDD frame of Long Term Evolution (LTE). In LTE, the TDD frame includes 10 TDD subframes. There are seven types of combination of allocation of a downlink subframe, an uplink subframe, and a special subframe with respect to the TDD subframes. In LTE, the time length of the TDD subframe is 1 millisecond. In the TDD scheme, allocation to each TDD subframe in the TDD frame is determined in accordance with uplink and downlink traffic. A ratio between uplink and downlink communication times in the TDD frame can be flexibly changed because allocation to the TDD subframe is determined in accordance with the traffic.

The special subframe (S) includes a downlink pilot time slot (DwPTS), a guard period (GP), and an uplink pilot time slot (UpPTS) (see Non-Patent Document 2). DwPTS is a time slot used for transmission of a downlink control signal. UpPTS is a time slot used for transmission of an uplink control signal. GP is a protection time for switching between an uplink signal and a downlink signal.

FIG. 14 is a diagram showing an example of bandwidth utilization of a wireless section and an optical section in a mobile fronthaul when a wireless base station of a TDD scheme is accommodated. In the wireless section, data signals are bidirectionally transmitted by performing switching between the transmission of the downlink signal and the transmission of the uplink signal on the time axis. Also, in the optical section, data signals are bidirectionally transmitted by alternately performing transmission of the uplink signal and transmission of the downlink signal on the time axis in accordance with the switching in the wireless section. Therefore, in an optical section adopting the WDM scheme, there may occur a period during which no signal is transmitted according to the TDD scheme (hereinafter referred to as a "TDD non-transmission period") on the time axis. That is, the TDD non-transmission period is a signal transmission stop period of the wireless communication system. The TDD non-transmission period occurs in both the uplink and the downlink.

There is a transmission system configured to superimpose a signal of a mobile system and a signal of another communication system which is Fiber To The Home (FFTH) or the like during the TDD non-transmission period (see Non-Patent Document 3).

FIG. 15 is a diagram showing an example of a network system using a passive optical network (PON) in an optical section. An optical line terminal (OLT) (an optical subscriber line termination device) is an optical device configured to estimate the TDD non-transmission period on the basis of a signal transmitted from a wireless communication system via an optical fiber.

FIG. 16 is a block diagram showing an example of a configuration of the OLT. In an initial state, the OLT allocates a bandwidth to the uplink signal of the wireless communication system in a fixed manner. Hereinafter, allocating a bandwidth in a fixed manner is called "fixed bandwidth allocation (FBA)." In the initial state, the OLT stops the transmission of a signal of another communication system. A TDD frame information estimation unit estimates a configuration of a TDD subframe. That is, the TDD frame information estimation unit determines whether the TDD subframe is a TDD subframe allocated to an uplink or a downlink on the basis of an estimation result.

The TDD frame information estimation unit estimates the TDD non-transmission period on the basis of a result of estimating the configuration of the TDD subframe and a result of estimating a timing of the TDD subframe. In order to estimate the TDD non-transmission period, the TDD frame information estimation unit needs to acquire a signal of a certain amount of traffic or more which is required (hereinafter referred to as a "required amount of traffic").

The traffic monitoring unit adjusts a length of time for which the traffic of the uplink signal of the wireless communication system is monitored so that the TDD frame information estimation unit can acquire a signal having an amount of traffic greater than or equal to the required amount of traffic. Also, the traffic monitoring unit may monitor the uplink signal or the downlink signal.

The TDD frame information estimation unit notifies a timing calculation unit of TDD frame pattern information. That is, the TDD frame information estimation unit transmits the result of estimating the configuration of the TDD subframe and information indicating the timing of the TDD subframe to the timing calculation unit. The timing calculation unit calculates a timing capable of being used by the wireless communication system for signal transmission (hereinafter referred to as a "usable timing") on the basis of the TDD frame pattern information. The timing calculation unit notifies a timing indication unit of the usable timing.

The timing indication unit determines a timing to be used by the wireless communication system for signal transmission (hereinafter referred to as a "use timing") on the basis of the usable timing. The timing indication unit notifies a downlink layer 2 switch (L2SW) of the use timing. The timing indication unit transmits the use timing to a bandwidth allocation method selection unit so as to switch a method in which the bandwidth allocation method selection unit allocates the bandwidth to the uplink signal.

In a state in which the TDD non-transmission period is estimated correctly (hereinafter referred to as a "normal state"), the bandwidth allocation method selection unit allocates a bandwidth to an uplink signal of the wireless communication system according to FBA during a period in which a signal is transmitted according to the TDD scheme on the time axis (hereinafter referred to as a "TDD transmission period"). In the normal state, the bandwidth allocation method selection unit allocates a bandwidth to a signal of another communication system according to FBA or dynamic bandwidth allocation (DBA) during the TDD non-transmission period. The bandwidth allocation method selection unit transmits information indicating a method of allocating a bandwidth (hereinafter referred to as "bandwidth allocation method information") to the bandwidth allocation unit. On the basis of the bandwidth allocation method information, the bandwidth allocation unit allocates an uplink signal of the wireless communication system to the bandwidth.

CITATION LIST

Non Patent Literature

[Non-Patent Document 1]
"NTT Technical Journal, Basic Technology Basic Course [GE-PON Technology], Part 1: PON," [online], 2005, Nippon Telegraph and Telephone Corporation, [found on May 21, 2015], Internet<URL http://www.ntt.co.jp/journal/0508/files/jn200508071.pdf>

[Non-Patent Document 2]
3GPP, "Evolved Universal Terrestrial Radio Access (E-UTRA) and Evolved Universal Terrestrial Radio Access Network (E-UTRAN); Overall description; Stage 2 (Release 12)," 3GPP TR 36.300 (V12.4.0), 2013 (5 Physical Layer for E-UTRA)

[Non-Patent Document 3]
Hisano et al., "A Study of Accommodation of Mobile and Other Systems in A PON system Using mobile TDD Frame Estimation," Society Conference of Electronic Information Communication 2015, B-8-10, Sepember 2015

SUMMARY OF INVENTION

Technical Problem

Hereinafter, the fact that the uplink TDD subframe is estimated to be the downlink TDD subframe or the fact that the downlink TDD subframe is estimated to be the uplink TDD subframe is referred to as an "estimation error." For example, the TDD frame information estimation unit may make this estimation error if the configuration of the TDD subframe of the wireless communication system is changed.

The TDD frame information estimation unit estimates the TDD non-transmission period on the basis of the uplink signal of the wireless communication system. If an estimation error occurs, the TDD frame information estimation unit erroneously estimates the TDD non-transmission period. The estimation error affects communication quality of the wireless communication system. For example, if a communication system other than the wireless communication system transmits an uplink signal during the TDD transmission period, the uplink signal of the wireless communication system may be delayed.

FIG. 17 is a time chart showing an example of traffic in a normal state. In the normal state, an estimated TDD non-transmission period and an actual TDD non-transmission period have the same timing if a propagation delay is ignored. That is, the uplink signal of the wireless communication system is transmitted in synchronization with a break of the configuration of the TDD subframe. The uplink signal of another communication system is transmitted in synchronization with a break of the configuration of the TDD subframe.

FIG. 18 is a time chart showing an example of traffic of an abnormal state in which an estimation error occurs. In the abnormal state, the estimated TDD non-transmission period is different from the actual TDD non-transmission period. Transmission of the uplink signal of the wireless communication system is delayed until a signal transmission section allocated on the basis of the estimation result. This delay is on the order of milliseconds, but there is a problem in that the delay cannot be tolerated in a mobile fronthaul.

In view of the above-described circumstances, an objective of the present invention is to provide a transmission system, a transmission method, and a transmission device capable of minimizing a delay occurring in a signal of a communication system even when an estimation error occurs in a configuration of the signal of the communication system in a transmission system, which accommodates a communication line of a communication system for performing communication according to TDD and a communication line of another communication system.

Solution to Problem

According to a first aspect of the present invention, there is provided a transmission system, which accommodates a communication line of a first communication system for performing communication according to TDD and a communication line of a second communication system, the transmission system including: a relay unit configured to relay uplink signals and downlink signals in the first and second communication systems; a TDD information estimation unit configured to estimate a transmission stop period during which no uplink signal of the first communication system is transmitted; an estimation error detection unit configured to detect that the estimation of the transmission stop period is erroneous on the basis of the uplink signal or the downlink signal of the first communication system; and a bandwidth allocation unit configured to prioritize allocation of a bandwidth in the relay unit for the uplink signal of the first communication system over allocation of a bandwidth in the relay unit for the uplink signal of the second communication system if the estimation of the transmission stop period is erroneous.

According to a second aspect of the present invention, in the transmission system according to the above-described first embodiment, the bandwidth allocation unit allocates a detection bandwidth for relaying the uplink signal of the first communication system during the transmission stop period, and the estimation error detection unit determines that there is an error in the estimation of the transmission stop period if the uplink signal of the first communication system is received by the relay unit in the detection bandwidth.

According to a third aspect of the present invention, in the transmission system according to the above-described first or second embodiment, the estimation error detection unit determines that there is an error in the estimation of the transmission stop period if the downlink signal of the first communication system is received by the relay unit during a period other than the transmission stop period.

According to a fourth aspect of the present invention, in the transmission system according to the above-described first to third embodiments, the bandwidth allocation unit performs allocation to the uplink signal of the first communication system every predetermined cycle, and the bandwidth allocation unit updates a timing at which the cycle starts when the estimation error detection unit determines that there is an error in the estimation of the transmission stop period.

According to a fifth aspect of the present invention, in the transmission system according to the above-described first to fourth embodiments, the estimation error detection unit determines that there is an error in the estimation of the transmission stop period if an amount of traffic in an uplink of the first communication system periodically increases or decreases.

According to a sixth aspect of the present invention, there is provided a transmission method for use in a transmission system, which accommodates a communication line of a first communication system for performing communication according to TDD and a communication line of a second communication system, the transmission method including the steps of: relaying uplink signals and downlink signals in the first and second communication systems; estimating a transmission stop period during which no uplink signal of the first, communication system is transmitted; detecting that the estimation of the transmission stop period is erroneous on the basis of the uplink signal or the downlink signal of the first communication system; and prioritizing allocation of a bandwidth in the relaying for the uplink signal of the first communication system over allocation of a bandwidth in the relaying for the uplink signal of the second communication system if it is detected that the estimation of the transmission stop period is erroneous.

According to a seventh aspect of the present invention, there is provided a transmission device, which accommodates a communication line of a first communication system for performing communication according to TDD and a communication line of a second communication system, the transmission device including: a relay unit configured to relay uplink signals and downlink signals in the first and second communication systems; a TDD information estimation unit configured to estimate a transmission stop period during which no uplink signal of the first communication system is transmitted; an estimation error detection unit configured to detect that the estimation of the transmission stop period is erroneous on the basis of the uplink signal or the downlink signal of the first communication system; and a bandwidth allocation unit configured to prioritize allocation of a bandwidth in the relay unit for the uplink signal of the first communication system over allocation of a bandwidth in the relay unit for the uplink signal of the second communication system if the estimation of the transmission stop period is erroneous.

Advantageous Effects of Invention

According to the present invention, it is possible to minimize a delay occurring in a signal of a communication system even when an estimation error occurs in a configuration of the signal of the communication system in a transmission system, which accommodates a communication line of a communication system for performing communication according to TDD and a communication line of another communication system.

DESCRIPTION OF EMBODIMENTS

Embodiments of the present invention will be described in detail with reference to the drawings.

First Embodiment

Figure 1:
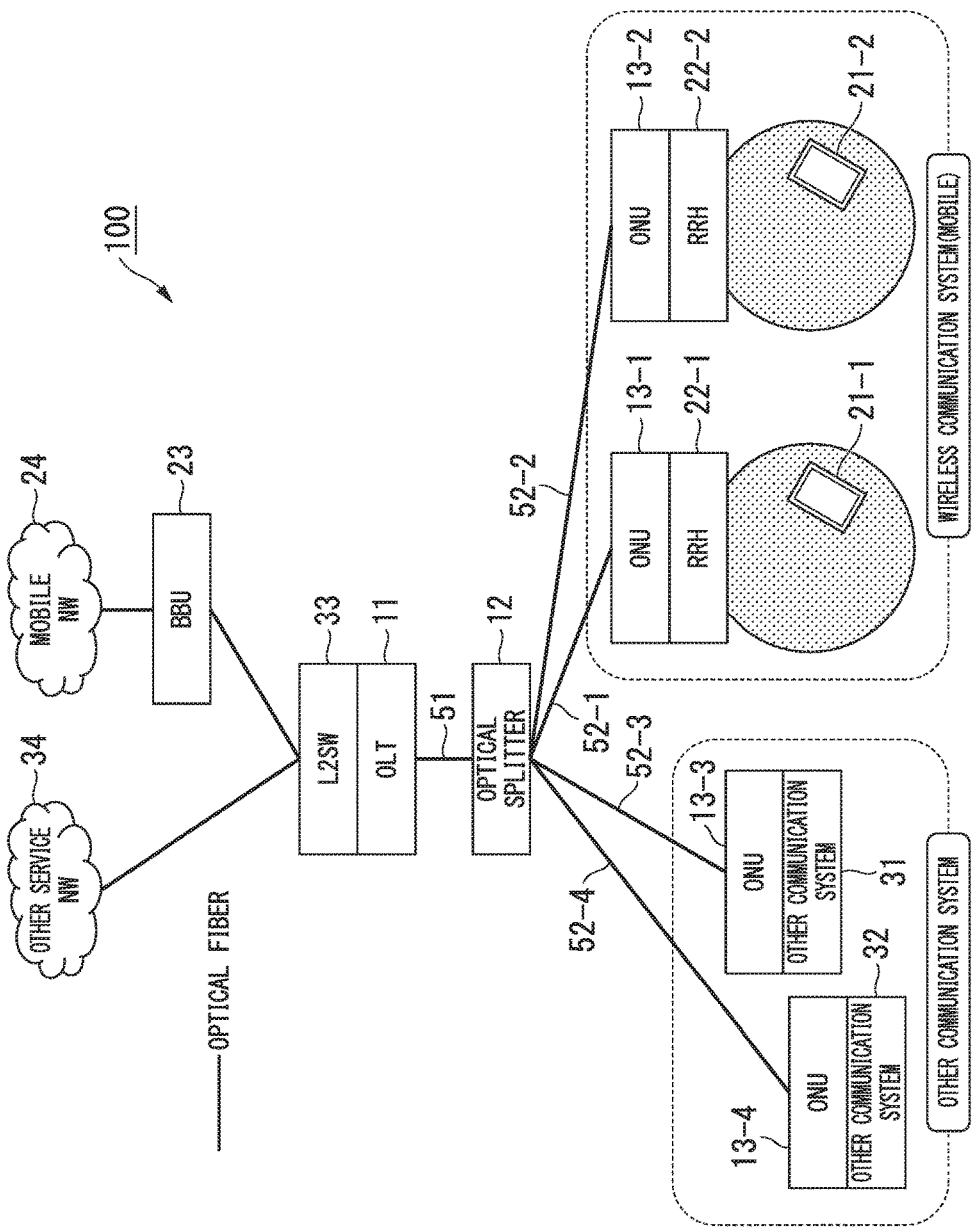
FIG. 1 is a diagram showing an example of a configuration of a network system in an embodiment.

FIG. 1 is a diagram showing an example of a configuration of a network system 100. The network system 100 (a transmission system) includes, an OLT 11 (a transmission device), an optical splitter 12, optical network units (ONUs) 13-1 to 13-4, mobile wireless terminals 21-1 and 21-2, RRHs 22-1 and 22-2 (wireless communication systems), a BBU 23, a mobile NW 24 (a mobile network), another communication system 31, another communication system 32, a layer 2 switch (L2SW) 33, another service NW 34 (another service network), an optical fiber 51, and optical fibers 52-1 to 52-4.

Hereinafter, when items common to the ONUs 13-1 to 13-4 are described, a part of the reference sign will be omitted and the ONUs 13-1 to 13-4 are referred to as an "ONU 13." Hereinafter, when items common to the mobile wireless terminals 21-1 and 21-2 are described, a part of the reference sign will be omitted and the mobile wireless terminals 21-1 and 21-2 are referred to as a "mobile wireless terminal 21." Hereinafter, when items common to the RRHs 22-1 and 22-2 are described, a part of the reference sign will be omitted and the RRHs 22-1 and 22-2 are referred to as an "RRH 22." Hereinafter, when items common to the optical fibers 52-1 to 52-4 are described, a part of the reference sign will be omitted and the optical fibers 52-1 to 52-4 are referred to as an "optical fiber 52."

The network system 100 may include more ONUs 13. The network system 100 may include more mobile wireless terminals 21. The network system 100 may include more RRHs 22.

Hereinafter, a direction from the OLT 11 to the ONU 13 is referred to as a "downlink." Hereinafter, a direction from the ONU 13 to the OLT 11 is referred to as an "uplink." In FIG. 1, the optical section is a section from the OLT 11 to the ONU 13. The optical section is, for example, a PON. A network topology of the network system 100 may have any configuration and is not limited to a specific topology. In the following, as an example, a case in which the network system 100 includes a PON will be described.

The OLT 11 is an optical subscriber line termination device. The OLT 11 is a device higher than the ONU 13. For example, the OLT 11 is managed by a communication carrier. The OLT 11 relays a signal of the RRH 22 to the BBU 23. The OLT 11 receives a signal of the RRH 22-1 via the ONU 13-1, the optical fiber 52-1, the optical splitter 12, and the optical fiber 51, and relays the received signal to the BBU 23. The OLT 11 receives a signal of the RRH 22-2 via the ONU 13-2, the optical fiber 52-2, the optical splitter 12, and the optical fiber 51, and relays the received signal to the BBU 23. The OLT 11 accommodates a communication line between the RRH 22 and the BBU 23. The OLT 11 relays signals to be transmitted and received between the RRH 22 and the BBU 23.

The OLT 11 relays a signal of the other communication system 31 to the other service NW 34. The OLT 11 receives a signal of the other communication system 31 via the ONU 13-3, the optical fiber 52-3, the optical splitter 12, and the optical fiber 51, and relays the received signal to another communication system higher-order device of the other service NW 34. The OLT 11 receives a signal of the other communication system 32 via the ONU 13-4, the optical fiber 52-4, the optical splitter 12, and the optical fiber 51 and relays the received signal to another communication system higher-order device of the other service NW 34. The OLT 11 accommodates communication lines between the other communication systems 31 and 32 and the other communication system higher-order device of the other service NW. The OLT 11 relays signals to be transmitted and received between the other communication systems 31 and 32 and the other communication system higher-order device of the other service NW.

The OLT 11 determines a TDD non-transmission period (a period during which communication based on the TDD scheme is absent) in the uplink and the downlink of the optical section. The OLT 11 transmits signals of the other communication systems 31 and 32 during the TDD non-transmission period of the RRH 22. That is, the OLT 11 relays the uplink signals acquired from the other communication systems 31 and 32 during the TDD non-transmission period of the uplink of the optical section. The OLT 11 relays downlink signals to the other communication systems 31 and 32 during the TDD non-transmission period of the downlink in the optical section.

The OLT 11 transmits a signal to and from the ONU 13 according to an FDD scheme. In the FDD scheme, different frequency bands are used for the uplink and the downlink. The OLT 11 transmits optical signals having different wavelengths in the uplink and the downlink according to a WDM scheme. The WDM scheme is a type of FDD scheme in optical transmission. In the WDM scheme, a first wavelength $\lambda 1$ and a second wavelength $\lambda 2$ of the optical signal are determined.

The OLT 11 relays the downlink signal of the mobile NW 24 to the ONU 13-1 by using an optical signal of the first wavelength $\lambda 1$ which is predetermined. The OLT 11 relays the downlink signal of the mobile NW 24 to the ONU 13-2 by using the optical signal of the first wavelength $\lambda 1$. The OLT 11 relays a downlink signal of the other service NW 34 to the ONU 13-3 by using the optical signal of the first wavelength $\lambda 1$. The OLT 11 relays a downlink signal of the other service NW 34 to the ONU 13-4 by using the optical signal of the first wavelength $\lambda 1$.

The OLT 11 relays an uplink signal of the ONU 13-1 to the mobile NW 24 by using the optical signal of the second wavelength $\lambda 2$ which is predetermined. The OLT 11 relays an uplink signal of the ONU 13-2 to the mobile NW 24 by using the optical signal of the second wavelength $\lambda 2$. The OLT 11 relays an uplink signal of the ONU 13-3 to the other service NW 34 by using the optical signal of the second wavelength $\lambda 2$. The OLT 11 relays an uplink signal of the ONU 13-4 to the other service NW 34 by using the optical signal of the second wavelength $\lambda 2$. Also, the OLT 11 may relay a signal by using an optical signal and a radio signal other than the optical signal.

The optical splitter 12 distributes an optical signal of a time division multiplex (TDM) scheme received via the optical fiber 51 to the ONUs 13-1 to 13-4. The optical splitter 12 multiplexes optical signals of a time division multiple access (TDMA) scheme received from the ONUs 13-1 to 13-4 via the optical fiber 52. The optical splitter 12 transmits a multiplexed optical signal to the OLT 11 via the optical fiber 51.

The ONU 13 is a communication device. For example, the ONU 13 is an optical subscriber line network device. For example, the ONU 13 is installed in a subscriber's home. The ONU 13-1 is connected to the RRH 22-1. The ONU 13-1 relays communication between the optical splitter 12 and the RRH 22-1. The ONU 13-2 is connected to the RRH 22-2. The ONU 13-2 relays communication between the optical splitter 12 and the RRH 22-2. The ONU 13-3 is connected to the other communication system 31. The ONU 13-3 relays communication between the optical splitter 12 and the other communication system 31. The ONU 13-4 is connected to the other communication system 32. The ONU 13-4 relays communication between the optical splitter 12 and the other communication system 32.

The mobile wireless terminal 21 may communicate according to the TDD scheme by using a radio signal of a frequency f1 in the wireless section with the RRH 22.

The RRH 22 executes uplink and downlink communication with the ONU 13 according to the TDD scheme. In the TDD scheme, the same frequency band is used in the uplink and the downlink. In the TDD scheme, signals are orthogonal on a time axis. The RRH 22 may perform communication according to the TDD scheme by using a radio signal of the frequency f1 in the wireless section with the mobile wireless terminal 21.

Hereinafter, the ONU 13-1, the mobile wireless terminal 21-1, and the RRH 22-1 are collectively referred to as a "wireless communication system." The wireless communication system may further include the ONU 13-2, the mobile wireless terminal 21-2, and the RRH 22-2.

The BBU 23 is a signal processing unit of the wireless base station. The BBU 23 transmits a signal acquired from the L2SW 33 to the mobile NW 24. The BBU 23 transmits a signal acquired from the mobile NW 24 to the L2SW 33.

The mobile NW 24 is a mobile communication network. The mobile NW 24 is a higher-order network for the wireless communication system. The mobile NW 24 includes communication devices. The mobile NW 24 communicates with the BBU 23.

The other communication system 31 is more tolerant of requirements such as a high speed and low latency than a mobile network system including the mobile wireless terminal 21, the RRH 22, the BBU 23, and the mobile NW 24.

The other communication system 32 is different from the other communication system 31. The other communication system 32 is more tolerant of requirements such as high speed and low delay than the mobile network system including the mobile wireless terminal 21, the RRH 22, the BBU 23, and the mobile NW 24. Hereinafter, when items common to the other communication system 31 and the other communication system 32 are described, the reference signs will be omitted and the other communication system 31 and the other communication system 32 are referred to as the "other communication system."

The L2SW 33 transmits a signal acquired from the BBU 23 or the other service NW 34 to the OLT 11. The L2SW 33 transmits a signal acquired from the OLT 11 to the BBU 23 or the other service NW 34. For example, the L2SW 33 determines a relay destination on the basis of a media access control (MAC) address.

The other service NW 34 includes another communication system higher-order device which is a communication device. The other service NW 34 is a higher-order network for the other communication system. The other service NW 34 communicates with the other communication system via the L2SW 33.

Figure 2:
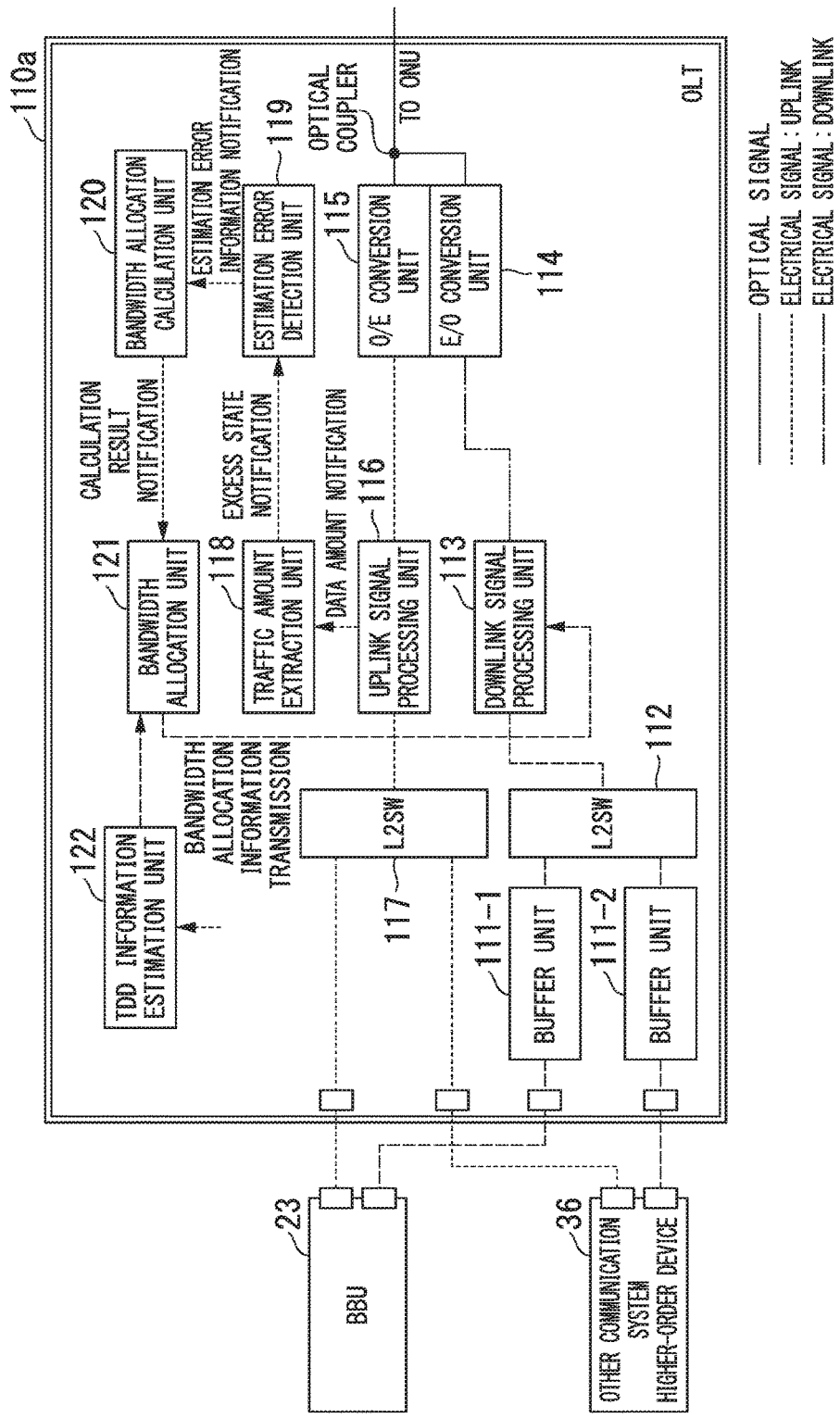
FIG. 2 is a block diagram showing an example of a configuration of an OLT in the first embodiment.

FIG. 2 is a block diagram showing an example of a configuration of an OLT 110a in the first embodiment. The OLT 110a is the OLT 11 shown in FIG. 1. Also, the OLT 110a may be an external device connected to the OLT 11.

If the amount of traffic relayed by the OLT 11 is periodically excessive in the network system 100, there is a high likelihood that an estimation error will occur. In an abnormal state, an amount of data of the uplink signal waiting for transmission stored in buffer units of the ONUs 13-1 and 13-2 is larger than in the normal state. The buffer units of the ONUs 13-1 and 13-2 simultaneously transmit the uplink signals having a large amount of data at a transmittable time. Thus, in the network system 100, an excessive amount of periodic traffic occurs. Congestion may occur when traffic exceeds a certain amount.

In the first embodiment, the OLT 110a monitors an uplink signal of the wireless communication system transmitted from the ONU 13-1 or 13-2. The OLT 110a detects an increase or decrease in an amount of traffic of the network on the basis of an uplink signal of the wireless communication system.

The OLT 110a includes a buffer unit 111-1, a buffer unit 111-2, an L2SW 112, a downlink signal processing unit 113, an electrical-to-optical (E/O) conversion unit 114, an optical-to-electrical (O/E) conversion unit 115, an uplink signal processing unit 116, an L2SW 117, a traffic amount extraction unit 118, an estimation error detection unit 119, a bandwidth allocation calculation unit 120, a bandwidth allocation unit 121, and a TDD information estimation unit 122.

Hereinafter, the buffer unit 111-1, the buffer unit 111-2, the L2SW 112, the downlink signal processing unit 113, the E/O conversion unit 114, the O/E conversion unit 115, the uplink signal processing unit 116, and the L2SW 117 are collectively referred to as a "relay unit."

For example, some or all of the relay unit, the traffic amount extraction unit 118, the estimation error detection unit 119, the bandwidth allocation calculation unit 120, the bandwidth allocation unit 121, and the TDD information estimation unit 122 may be software functional units which function when a processor such as a central processing unit (CPU) executes a program stored in a memory. Also, some or all of these functional units may be hardware functional units (circuits) such as a large scale integration circuit (LSI) and an application specific integrated circuit (ASIC).

The buffer unit 111-1 acquires a downlink signal from the BBU 23. The buffer unit 111-1 temporarily stores the downlink signal. The buffer unit 111-1 transmits the downlink signal to the L2SW 112.

The buffer unit 111-2 acquires a downlink signal from the other communication system higher-order device 36. The buffer unit 111-2 temporarily stores the downlink signal. The buffer unit 111-2 transmits the downlink signal to the L2SW 112.

In accordance with a control signal, the L2SW 112 acquires a downlink signal from the buffer unit 111-1 or the buffer unit 111-2. The L2SW 112 transmits the downlink signal to the downlink signal processing unit 113.

The downlink signal processing unit 113 acquires information indicating a bandwidth to be allocated to the uplink signal (hereinafter referred to as "bandwidth allocation information") from the bandwidth allocation unit 121. The downlink signal processing unit 113 converts the downlink signal acquired from the L2SW 112 into a frame for use in the PON. For example, the downlink signal processing unit 113 may generate a GATE frame including the bandwidth allocation information. The downlink signal processing unit 113 transmits the bandwidth allocation information to the E/O conversion unit 114.

The E/O conversion unit 114 converts a downlink signal (an electrical signal) converted into a frame by the downlink signal processing unit 113 into an optical signal of a wavelength $\lambda 1$. The E/O conversion unit 114 transmits the optical signal of the first wavelength $\lambda 1$ to the optical fiber 51 via an optical coupler. The optical signal is transmitted to the ONU 13 via the optical fiber 51 and the optical fiber 52.

The O/E conversion unit 115 acquires an optical signal of the second wavelength $\lambda 2$ from the ONU 13 via the optical fiber 52, the optical splitter 12, and the optical fiber 51. The O/E conversion unit 115 converts the received optical signal into an electrical signal. The O/E conversion unit 115 transmits the electrical signal to the uplink signal processing unit 116.

The uplink signal processing unit 116 converts the electrical signal acquired from the O/E conversion unit 115 into a predetermined signal according to the uplink signal. The uplink signal processing unit 116 transmits the converted uplink signal to the L2SW 117.

The L2SW 117 acquires an uplink signal from the uplink signal processing unit 116. The L2SW 117 transmits the uplink signal to the BBU 23 or the other communication system higher-order device 36 in accordance with a destination of the uplink signal.

The traffic amount extraction unit 118 monitors the uplink signal. For example, the traffic amount extraction unit 118 detects an excessive amount of traffic of the uplink signal of the wireless communication system. The traffic amount extraction unit 118 transmits information indicating that an excess state of traffic has been detected (hereinafter referred to as an "excess state notification") to the estimation error detection unit 119. An excessive amount of traffic is detected using a determination as to whether or not the traffic has exceeded a predetermined first threshold value or a determination as to whether a variance of traffic has exceeded a predetermined second threshold value. When the traffic has exceeded the first threshold, or when the variance of the traffic has exceeded the second threshold value, an excessive amount of traffic is detected.

The estimation error detection unit 119 detects occurrence of an estimation error on the basis of an excess state notification. For example, if the excessive amount of traffic is periodic, the estimation error detection unit 119 determines that the estimation error has occurred. The estimation error detection unit 119 transmits information indicating that the estimation error has occurred (hereinafter referred to as "estimation error information") to the bandwidth allocation calculation unit 120.

If the estimation error information is acquired, the bandwidth allocation calculation unit 120 re-calculates the bandwidth allocation information. That is, if the estimation error information is acquired, the bandwidth allocation calculation unit 120 re-determines the bandwidth allocation information. The bandwidth allocation calculation unit 120 transmits the bandwidth allocation information (a calculation result) to the bandwidth allocation unit 121.

The bandwidth allocation unit 121 transmits the bandwidth allocation information to the ONU 13 via the downlink signal processing unit 113. If the estimation of the TDD non-transmission period is erroneous, the bandwidth allocation unit 121 initializes the allocation of a bandwidth to the uplink signal of the wireless communication system. For example, if the estimation of the TDD non-transmission period is erroneous, the bandwidth allocation unit 121 initializes a bandwidth allocation method. In the initial state, the bandwidth allocation unit 121 allocates a bandwidth to the uplink signal of the wireless communication system according to FBA. In the initial state, the bandwidth allocation unit 121 stops the transmission of a signal of the other communication system. An amount of traffic in the network system 100 returns to the initial state on the basis of the bandwidth allocation information.

Figure 16:
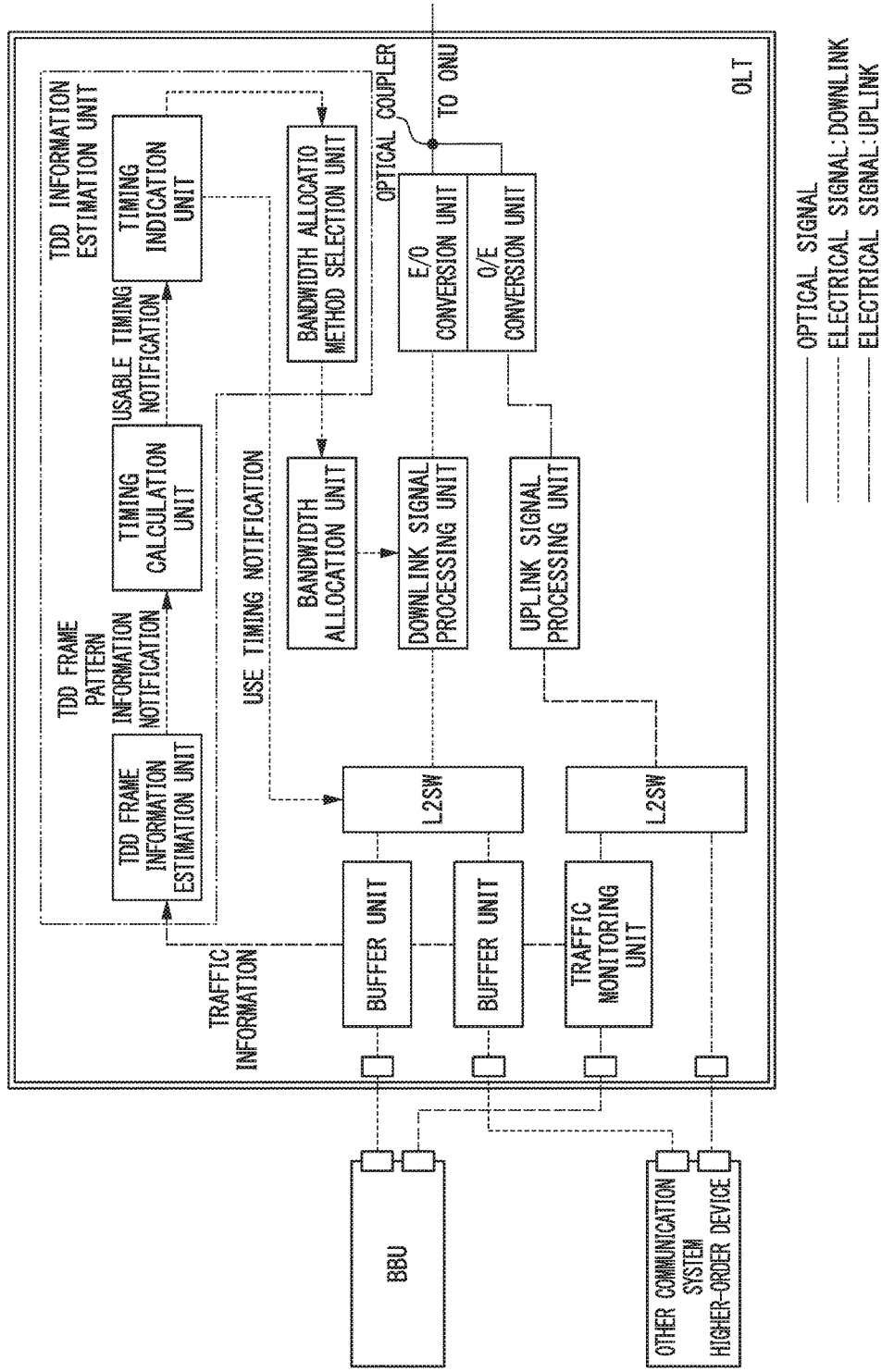
FIG. 16 is a block diagram showing an example of a configuration of an OLT in the conventional technology.
Figure 17:
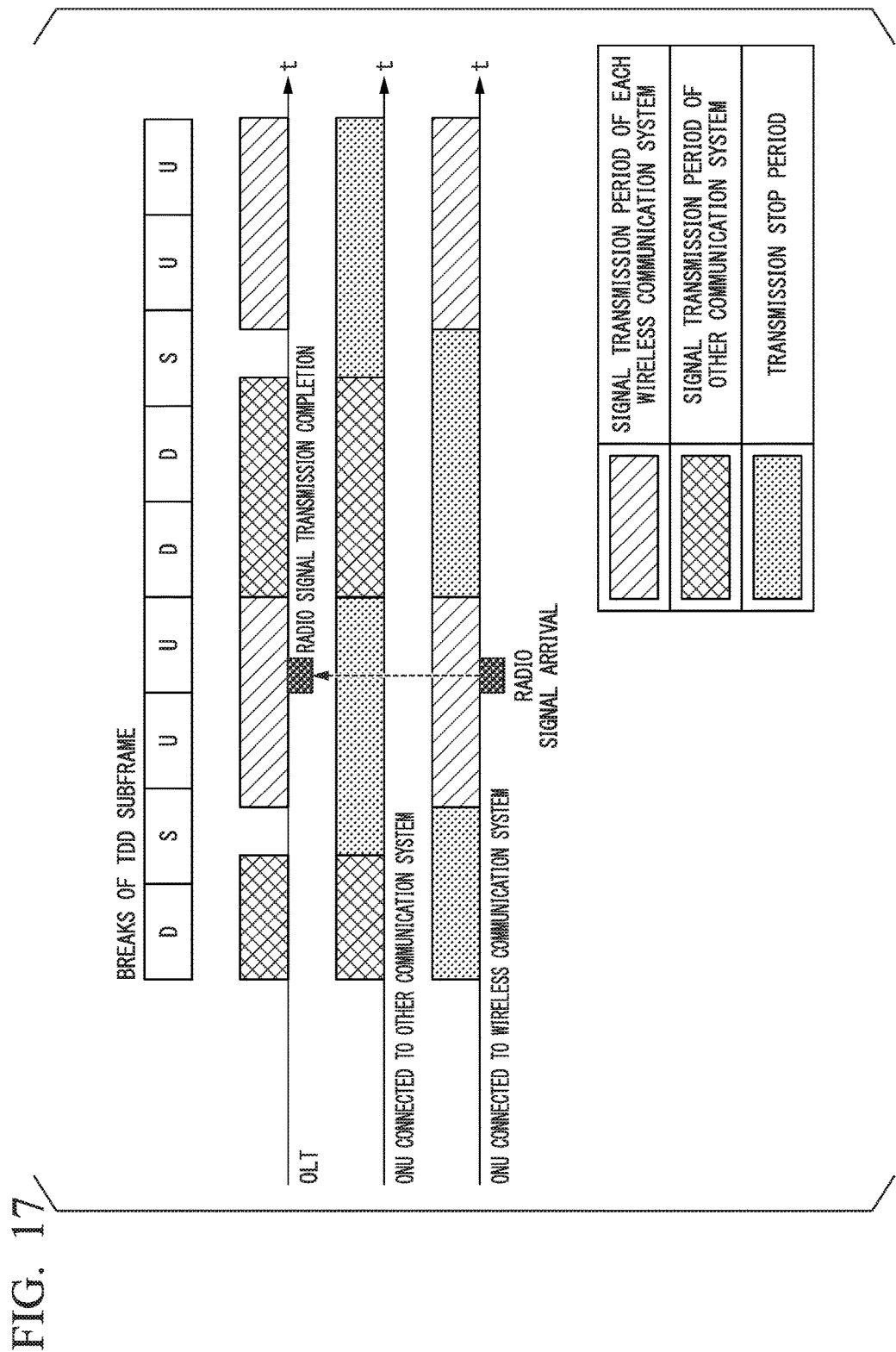
FIG. 17 is a time chart showing an example of traffic of a normal state in the conventional technology.
Figure 18:
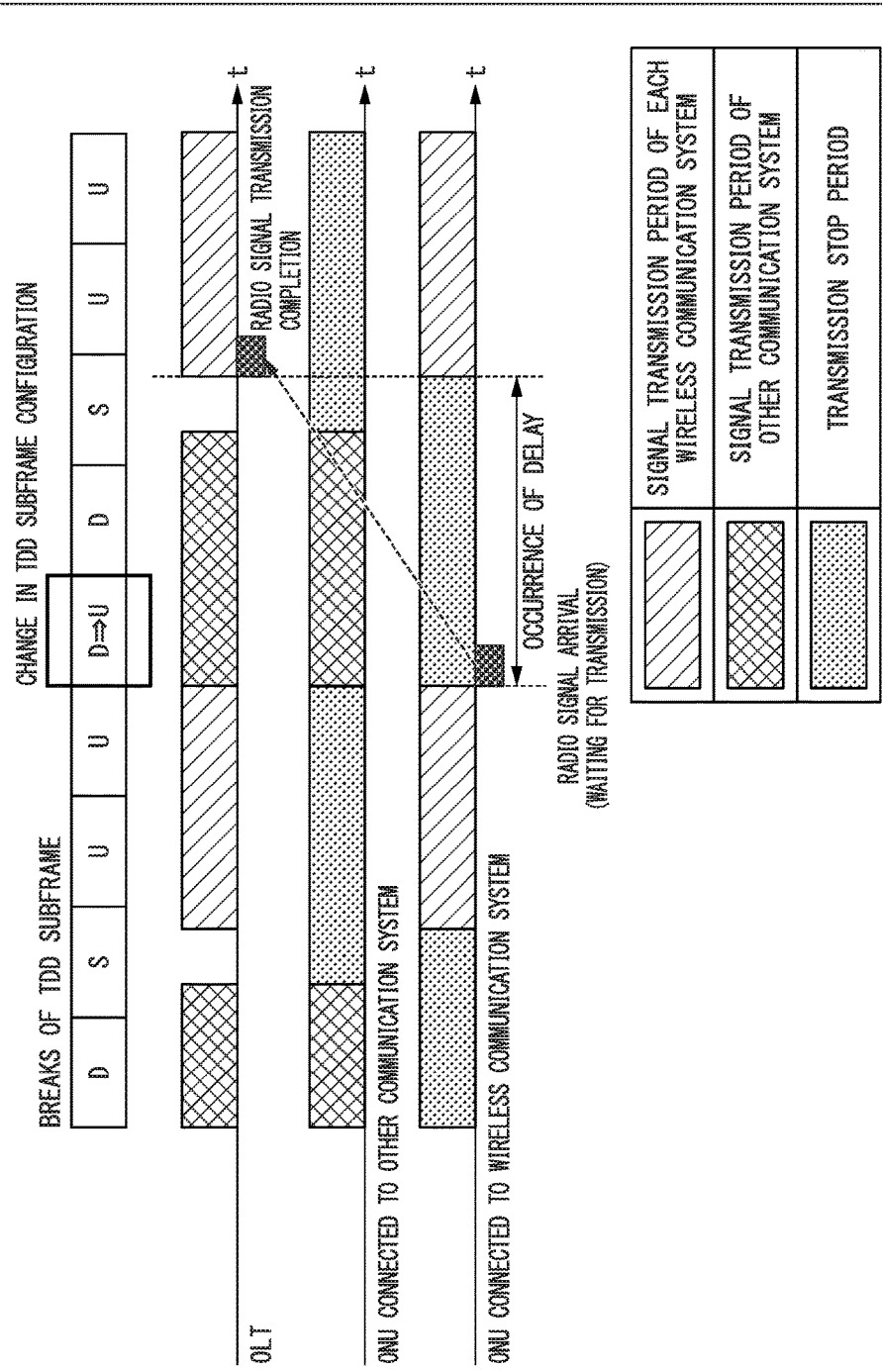
FIG. 18 is a time chart showing an example of traffic in an abnormal state in which an estimation error occurs in the conventional technology.

The TDD information estimation unit 122 includes a TDD frame information estimation unit, a timing calculation unit, a timing indication unit, and a bandwidth allocation method selection unit shown in FIG. 16. The TDD frame information estimation unit of the TDD information estimation unit 122 estimates a configuration of a TDD subframe. The configuration of the TDD subframe indicates whether each TDD subframe in the TDD frame is allocated to any of a downlink subframe, an uplink subframe, and a special subframe. The TDD frame information estimation unit of the TDD information estimation unit 122 estimates the TDD non-transmission period on the basis of TDD frame pattern information indicating the estimated TDD subframe configuration.

The timing calculation unit of the TDD information estimation unit 122 calculates a usable timing capable of being used for transmission of the uplink signal on the basis of the TDD frame pattern information. The timing calculation unit of the TDD information estimation unit 122 notifies the timing indication unit of the TDD information estimation unit 122 of the calculated usable timing. The timing calculation unit of the TDD information estimation unit 122 determines a use timing to be used for transmission of the uplink signal.

The timing calculation unit of the TDD information estimation unit 122 transmits the determined use timing to the bandwidth allocation method selection unit of the TDD information estimation unit 122 in order to switch a method in which the bandwidth allocation method selection unit allocates a bandwidth to the uplink signal.

In the normal state, the bandwidth allocation method selection unit of the TDD information estimation unit 122 allocates a bandwidth to the uplink signal of the wireless communication system according to FBA during a TDD transmission period based on a specification timing. In the normal state, the bandwidth allocation method selection unit of the TDD information estimation unit 122 allocates a bandwidth to the signal of the other communication system according to FBA or DBA during a TDD non-transmission period. The bandwidth allocation method selection unit of the TDD information estimation unit 122 transmits bandwidth allocation method information indicating a method of allocating a bandwidth to the bandwidth allocation unit 121. On the basis of the bandwidth allocation method information, the bandwidth allocation unit 121 allocates an uplink signal of the wireless communication system to the bandwidth.

Figure 3:
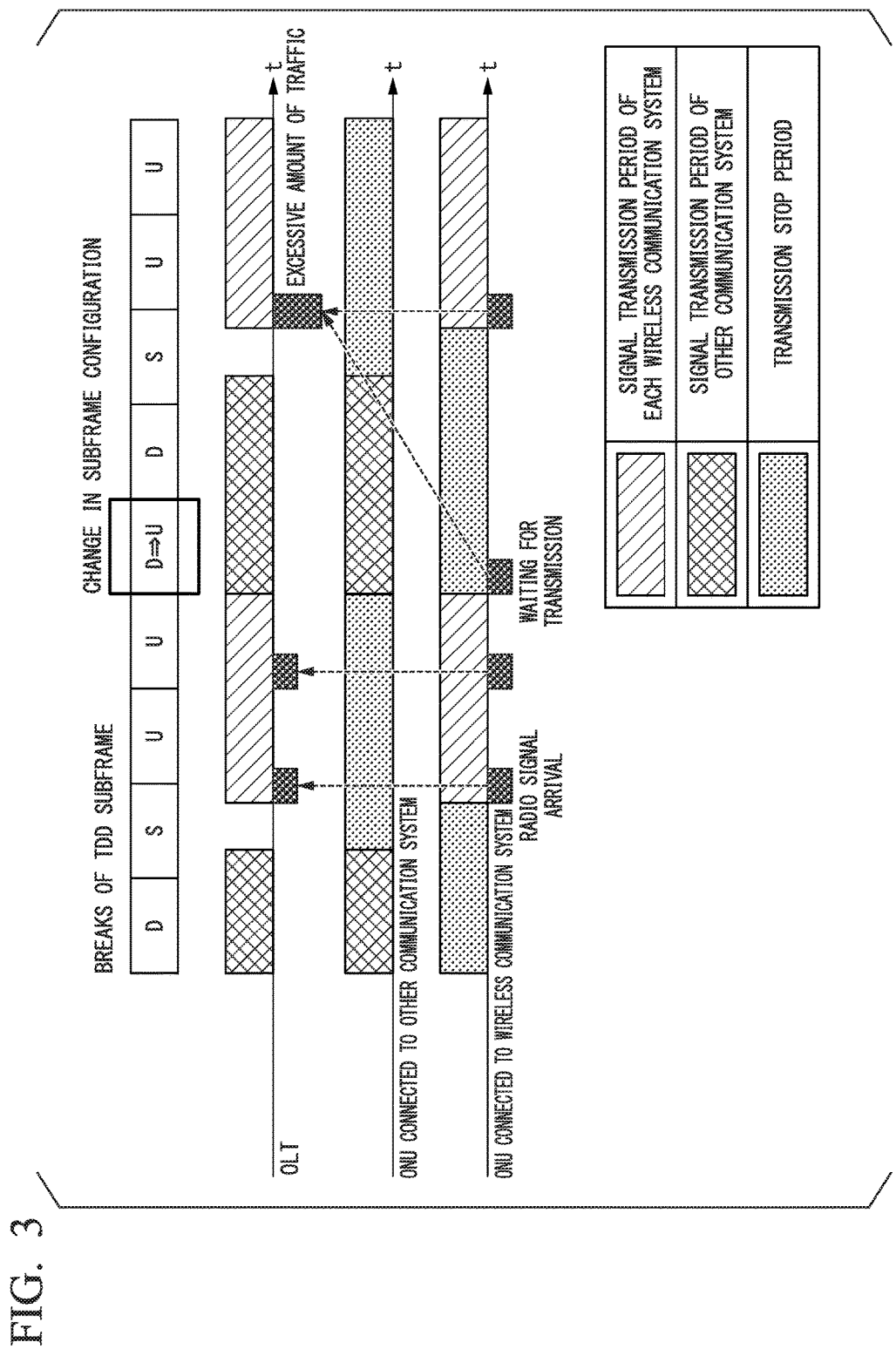
FIG. 3 is a time chart showing an example of traffic in the first embodiment.

FIG. 3 is a time chart showing an example of traffic in the first embodiment. The horizontal axis represents time. A first row from the top shows breaks of the configuration of the TDD subframe. A second row from the top shows a period during which the OLT 110*a* acquires a signal. A third row from the top shows a period during which the ONU 13-3 or 13-4 transmits a signal and a period during which the ONU 13-3 or 13-4 stops the transmission of the signal. A fourth row from the top shows a period during which the ONU 13-1 or 13-2 transmits a signal and a period during which the ONU 13-1 or 13-2 stops the transmission of the signal.

In the example shown in FIG. 3, allocation to some TDD subframes has been changed from downlink subframes to uplink subframes. Because a timing at which the configuration of the TDD subframe is changed is a transmission stop period, the ONU 13-1 or 13-2 waits for signal transmission. Because the timing at which the configuration of the TDD subframe is changed is the transmission stop period, the ONU 13-1 or 13-2 causes a signal to be stored in the buffer unit. Hereinafter, a period during which the uplink signal can be transmitted is referred to as a "signal transmission period." The ONU 13-1 or 13-2 transmits an uplink signal on standby for transmission and an uplink signal to be currently transmitted during the signal transmission period of the wireless communication system. Thus, an excessive amount of traffic occurs.

Figure 4:
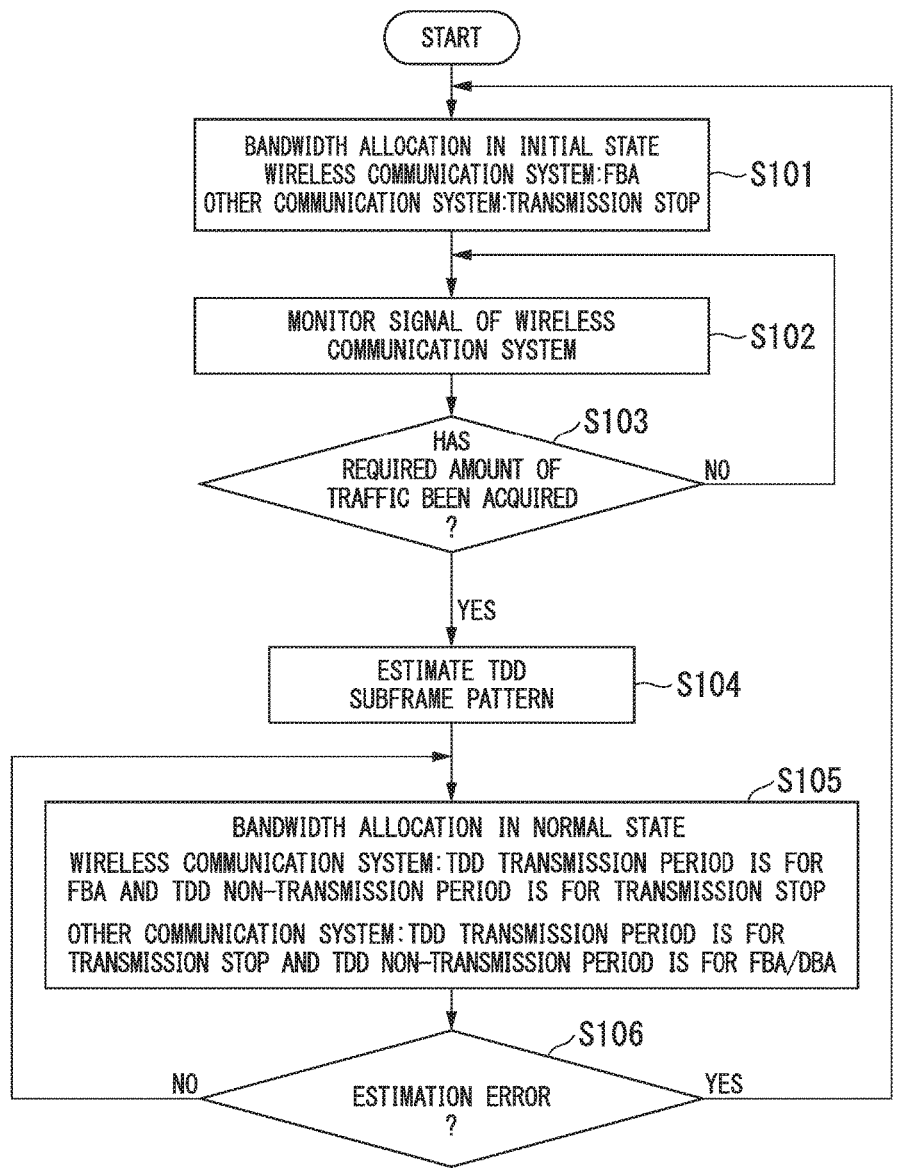
FIG. 4 is a flowchart showing an example of an operation of the OLT in the first embodiment.

FIG. 4 is a flowchart showing an example of the operation of the OLT 110*a* in the first embodiment. The bandwidth allocation unit 121 transmits the bandwidth allocation information to the ONU 13 via the downlink signal processing unit 113. In the initial state, the bandwidth allocation unit 121 allocates a bandwidth to the uplink signal of the wireless communication system according to FBA. In the initial state, the bandwidth allocation unit 121 stops the transmission of a signal of another communication system (step S101). The traffic amount extraction unit 118 monitors the uplink signal of the wireless communication system (step S102).

The TDD information estimation unit 122 determines whether or not a signal of a required amount of traffic or more has been acquired (step S103). If the TDD information estimation unit 122 has not acquired a signal of a required amount of traffic or more (step S103: NO), the traffic amount extraction unit 118 returns the process to step S102. If the TDD information estimation unit 122 has acquired a signal of a required amount of traffic or more (step S103: YES), the TDD information estimation unit 122 estimates a configuration of a TDD subframe (step S104).

In the normal state, the TDD information estimation unit 122 allocates a bandwidth to the uplink signal of the wireless communication system according to FBA during the TDD transmission period. In the normal state, the TDD information estimation unit 122 stops the transmission of the uplink signal of the wireless communication system dining the TDD non-transmission period.

In the normal state, the TDD information estimation unit 122 stops the transmission of the signal of the other communication system during the TDD transmission period. In the normal state, the TDD information estimation unit 122 allocates the bandwidth to the signal of the other communication system according to FBA or DBA during the TDD non-transmission period (step S105).

The estimation error detection unit 119 determines whether or not an estimation error has occurred (step S106). If an estimation error has occurred (step S106: YES), the bandwidth allocation unit 121 initializes the allocation of a bandwidth to the uplink signal of the wireless communication system. That is, the bandwidth allocation unit 121 returns the process to step S101. If no estimation error has occurred (step S106: NO), the bandwidth allocation unit 121 returns the process to step S105.

As described above, the network system 100 of the first embodiment is a transmission system configured to accommodate a communication line of a communication system performing communication according to TDD and a communication line of another communication system which is different therefrom. The network system 100 includes a relay unit, a TDD information estimation unit 122, an estimation error detection unit 119, a bandwidth allocation unit 121, and an ONU 13. The relay unit relays an uplink signal and a downlink signal of the wireless communication system including the RRH 22. The TDD information estimation unit 122 estimates a timing of a transmission stop period. The estimation error detection unit 119 detects that the estimation of the timing of the transmission stop period is erroneous on the basis of the uplink signal or the downlink signal. If the estimation of the timing of the transmission stop period is erroneous, the bandwidth allocation unit 121 initializes the allocation of the bandwidth to the uplink signal of the wireless communication system. The ONU 13 transmits the uplink signal of the wireless communication system on the basis of the bandwidth allocation.

If the amount of traffic of the uplink signal is periodically excessive, the estimation error detection unit 119 of the first embodiment determines that the estimation of the timing of the transmission stop period is erroneous. If it is determined that there is an error in the estimation, the bandwidth allocation unit 121 initializes the allocation of the bandwidth, thereby prioritizing the allocation of bandwidth to the uplink signal of the wireless communication system. Thereby, the network system 100 of the first embodiment (a transmission system) configured to accommodate a communication system for performing communication according to TDD and another communication system can minimize a delay occurring in a signal of the wireless communication system even when an estimation error occurs in a configuration of the signal of the communication system.

The network system 100 of the first embodiment accommodates a wireless communication system of a TDD scheme by using a PON. The network system 100 of the first embodiment detects an estimation error with respect to a configuration of a TDD subframe. The OLT 110a of the first embodiment (a transmission device) initializes bandwidth allocation information for the signal of the ONU 13. The OLT 110a of the first embodiment may initialize bandwidth allocation information for signals of all the ONUs 13 accommodated in the OLT 110a.

The network system 100 of the first embodiment reduces the delay of the uplink signal of the wireless communication system. For example, the network system 100 of the first embodiment reduces the delay of the uplink signal of the wireless communication system caused by erroneous estimation of the configuration of the TDD subframe. The network system 100 of the first embodiment can satisfy an allowable amount of delay required for a mobile fronthaul. The network system 100 of the first embodiment can enhance the effectiveness of the network system 100.

The OLT 110a of the first embodiment can share a wavelength of the optical signal with respect to the RRH 22 and the other communication system 31. The OLT 110a of the first embodiment can reduce the number of core wires of the optical fiber 51 by using an optical signal having a common wavelength. The OLT 110a of the first embodiment can reduce the number of devices in the network system 100 by using an optical signal having a common wavelength.

Second Embodiment

A second embodiment is different from the first embodiment in that an OLT 110b includes a detection bandwidth determination unit 123. In the second embodiment, only differences from the first embodiment will be described.

Figure 5:
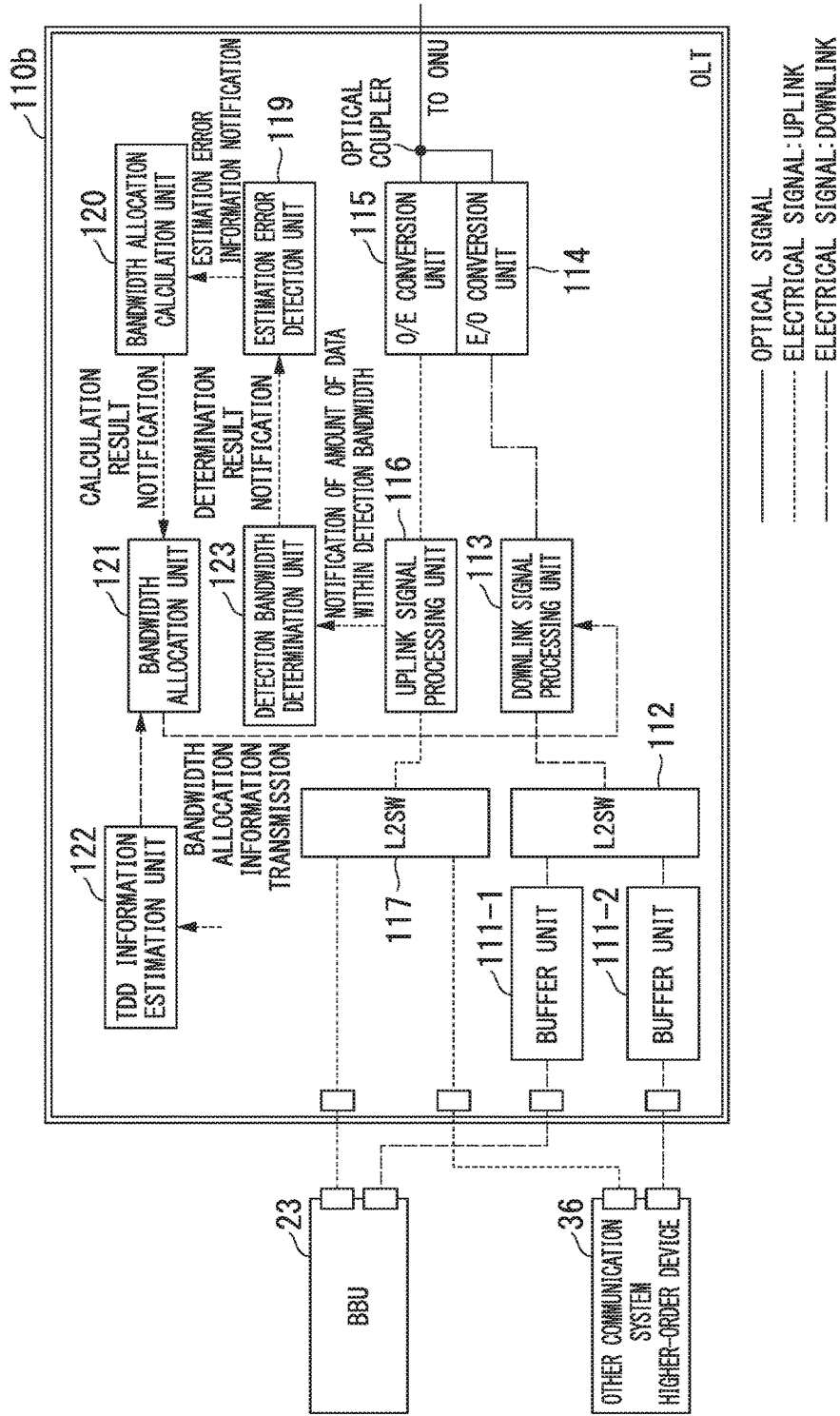
FIG. 5 is a block diagram showing an example of a configuration of an OLT in a second embodiment.

FIG. 5 is a diagram showing an example of a configuration of the OLT 110b in the second embodiment. The OLT 110b is the OLT 11 shown in FIG. 1. Also, the OLT 110b may be an external device connected to the OLT 11.

The OLT 110b includes a buffer unit 111-1, a buffer unit 111-2, an L2SW 112, a downlink signal processing unit 113, an E/O conversion unit 114, an O/E conversion unit 115, an uplink signal processing unit 116, an L2SW 117, an estimation error detection unit 119, a bandwidth allocation calculation unit 120, a bandwidth allocation unit 121, a TDD information estimation unit 122, and a detection bandwidth determination unit 123.

In the second embodiment, the bandwidth allocation unit 121 provides a bandwidth for detecting an estimation error (hereinafter referred to as an "estimation error detection bandwidth") during the TDD non-transmission period. Hereinafter, a period during which the estimation error detection bandwidth is provided is referred to as a detection period. The detection period is a period during which the uplink signal processing unit 116 does not acquire the uplink signal of the wireless communication system in the normal state. In the abnormal state, the detection period is a period during which the uplink signal processing unit 116 may acquire the uplink signal of the wireless communication system. The uplink signal processing unit 116 transmits information indicating an amount of data of the uplink signal in the estimation error detection bandwidth to the detection bandwidth determination unit 123.

The detection bandwidth determination unit 123 determines whether or not the uplink signal of the wireless communication system has been acquired during the detection period on the basis of the information indicating the amount of data of the uplink signal in the estimation error detection bandwidth. The detection bandwidth determination unit 123 transmits a determination result to the estimation error detection unit 119.

The estimation error detection unit 119 detects that an estimation error has occurred on the basis of the determination result of the detection bandwidth determination unit 123. That is, if the uplink signal of the wireless communication system is acquired during the detection period, the estimation error detection unit 119 determines that an estimation error has occurred. If it is detected that an estimation error has occurred, the estimation error detection unit 119 transmits estimation error information to the bandwidth allocation calculation unit 120.

If the estimation error information is acquired, the bandwidth allocation calculation unit 120 re-calculates the bandwidth allocation information. That is, if the estimation error information is acquired, the bandwidth allocation calculation unit 120 re-determines the bandwidth allocation information. The bandwidth allocation calculation unit 120 transmits the bandwidth allocation information to the bandwidth allocation unit 121.

The bandwidth allocation unit 121 transmits the bandwidth allocation information to an ONU 13 via the downlink signal processing unit 113. In the initial state, the bandwidth allocation unit 121 allocates a bandwidth to the uplink signal of the wireless communication system according to FBA (setting in the initial state). In the initial state, the bandwidth allocation unit 121 stops the transmission of a signal of the other communication system (setting in the initial state). The amount of traffic in the network system 100 returns to the initial state on the basis of the bandwidth allocation information. The downlink signal processing unit 113 transmits bandwidth allocation information (a downlink control signal) as a GATE signal (a transmission permission signal) (a GATE frame) to the ONU 13. The downlink signal processing unit 113 may transmit the bandwidth allocation information to all the ONUs 13 connected to the OLT 110b.

The TDD frame information estimation unit of the TDD information estimation unit 122 estimates the configuration of the TDD subframe. The TDD frame information estimation unit of the TDD information estimation unit 122 estimates the TDD non-transmission period.

In the normal state, the bandwidth allocation method selection unit of the TDD information estimation unit 122 allocates a bandwidth to the uplink signal of the wireless communication system according to FBA during the TDD transmission period. In the normal state, the bandwidth allocation method selection unit of the TDD information estimation unit 122 allocates a bandwidth to the signal of the other communication system according to FBA or DBA during the TDD non-transmission period. The bandwidth allocation method selection unit of the TDD information estimation unit 122 transmits bandwidth allocation method information indicating a method of allocating a bandwidth to the bandwidth allocation unit 121. On the basis of the bandwidth allocation method information, the bandwidth allocation unit 121 allocates an uplink signal of the wireless communication system to the bandwidth.

Figure 6:
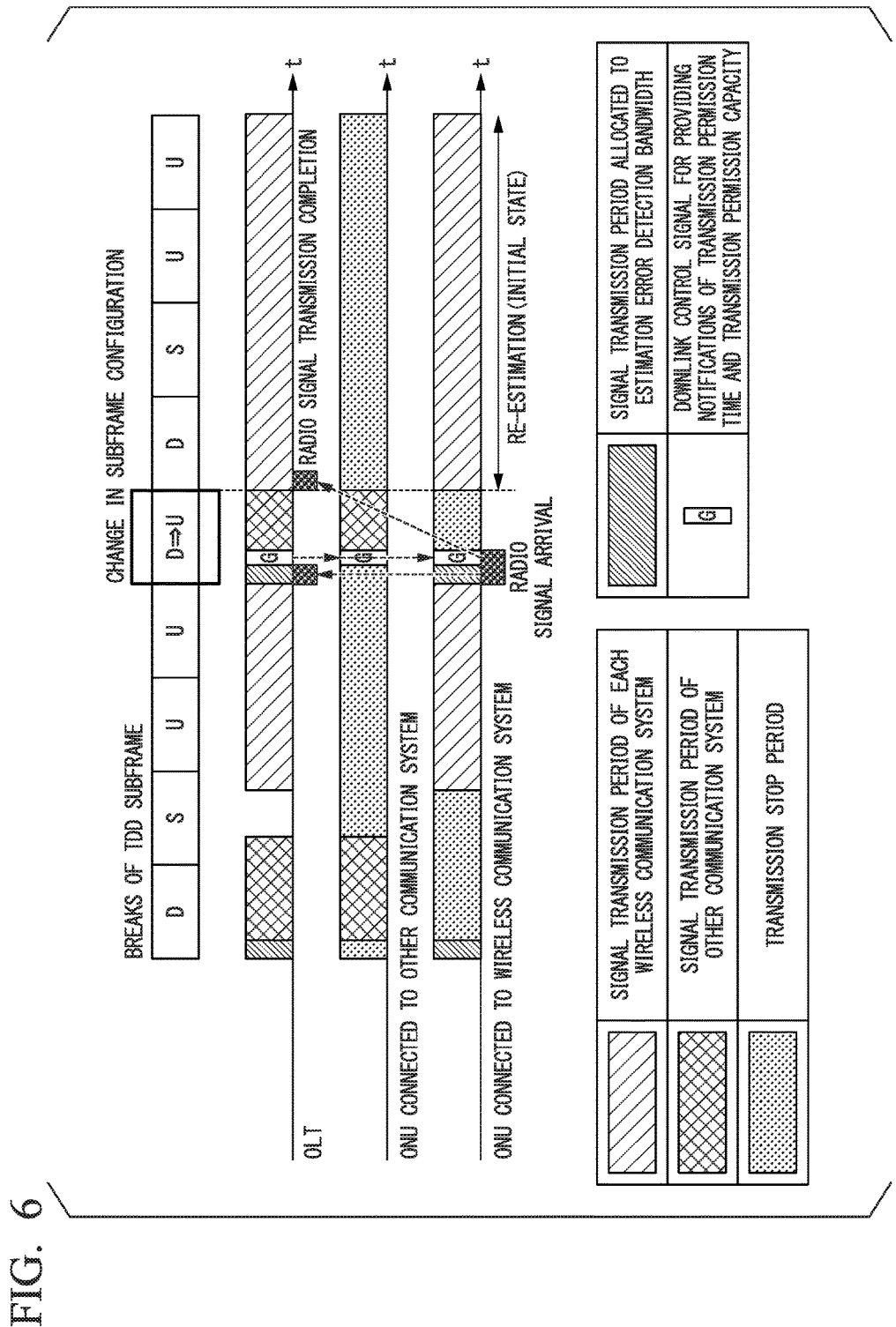
FIG. 6 is a time chart showing an example of traffic in the second embodiment.

FIG. 6 is a time chart showing an example of traffic in the second embodiment. The horizontal axis represents time. A first row from the top shows breaks of the configuration of the TDD subframe. A second row from the top shows a period during which the OLT 110b acquires a signal. A third row from the top shows a period during which an ONU 13-3 or 13-4 transmits a signal and a period during which the ONU 13-3 or 13-4 stops the transmission of the signal. A fourth row from the top shows a period during which an ONU 13-1 or 13-2 transmits a signal and a period during which the ONU 13-1 or 13-2 stops the transmission of the signal.

In the example shown in FIG. 6, allocation to some TDD subframes is changed from downlink subframes to uplink subframes. A detection period is allocated during the transmission stop period including a timing at which the configuration of the TDD subframe is changed. The OLT 110b acquires an uplink signal of the wireless communication system during the detection period. The downlink signal processing unit 113 transmits bandwidth allocation information as a GATE signal to the ONU 13. The ONU 13-1 or 13-2 transmits a signal on standby for transmission and a signal to be currently transmitted during the signal transmission period of the wireless communication system.

As described above, the bandwidth allocation unit 121 of the second embodiment determines the detection period. When the relay unit acquires the uplink signal of the wireless communication system during the detection period, the estimation error detection unit 119 determines that the estimation of the transmission stop period is erroneous. When it is determined that there is an error in estimation, the OLT 110b returns the bandwidth allocation to the initial state, and then allocates a bandwidth on the basis of a newly estimated transmission stop period.

Thereby, the network system 100 (a transmission system) of the second embodiment configured to accommodate a communication line of a communication system for performing communication according to TDD and a communication line of another communication system can minimize a delay occurring in a signal of a communication system even when an estimation error occurs in a configuration of the signal of the communication system.

Third Embodiment

A third embodiment is different from the second embodiment in that the estimation error detection unit 119 constantly monitors a downlink signal of a wireless communication system. In the third embodiment, only differences from the second embodiment will be described.

Figure 7:
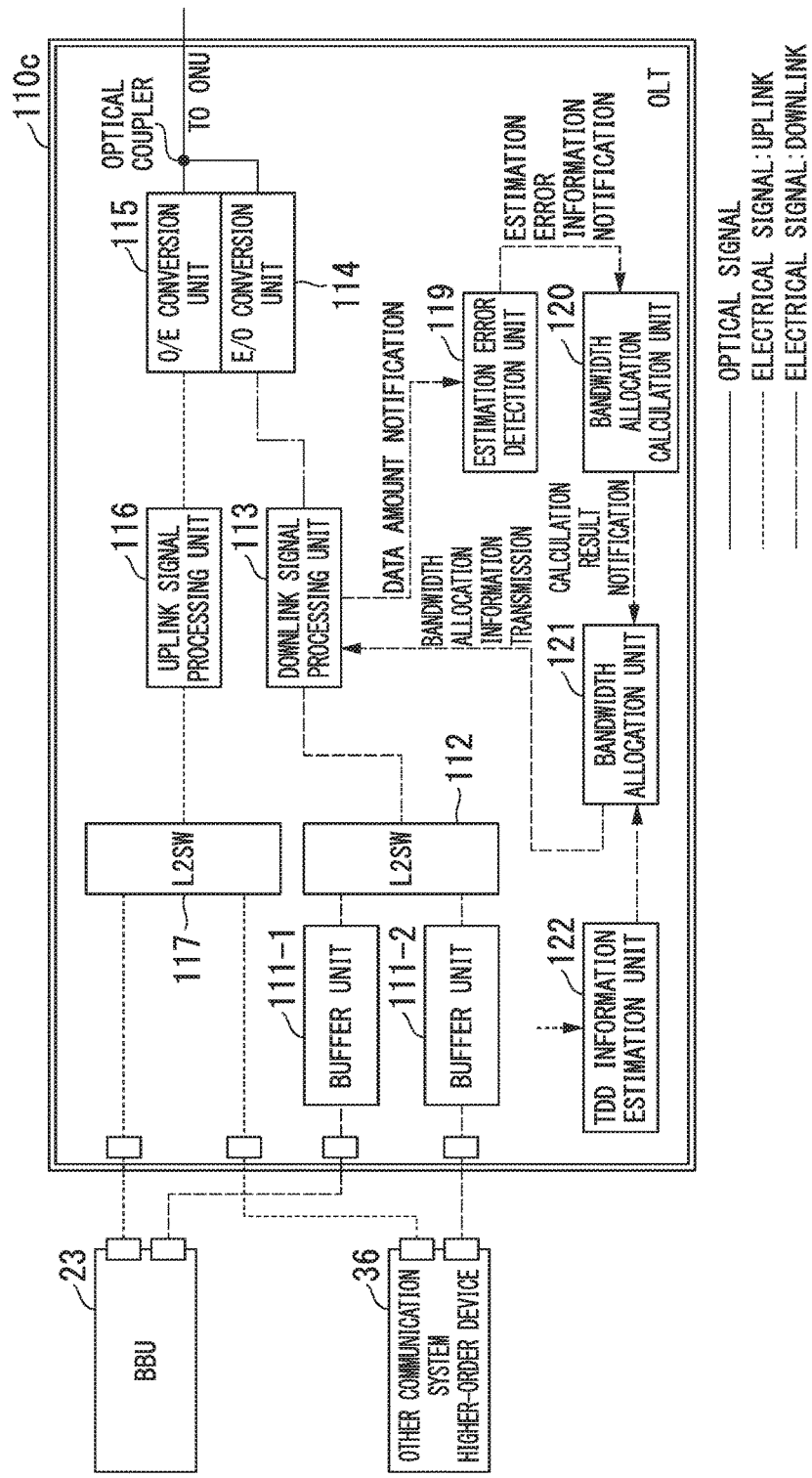
FIG. 7 is a block diagram showing an example of a configuration of an OLT in a third embodiment.

FIG. 7 is a diagram showing an example of a configuration of an OLT 110c in the third embodiment. The OLT 110c includes a buffer unit 111-1, a buffer unit 111-2, an L2SW 112, a downlink signal processing unit 113, an E/O conversion unit 114, an O/E conversion unit 115, an uplink signal processing unit 116, an L2SW 117, an estimation error detection unit 119, a bandwidth allocation calculation unit 120, a bandwidth allocation unit 121, and a TDD information estimation unit 122.

In the third embodiment, the downlink signal processing unit 113 constantly monitors an amount of data of the downlink signal of the wireless communication system. The downlink signal processing unit 113 transmits information indicating the amount of data of the downlink signal of the wireless communication system to the estimation error detection unit 119.

The estimation error detection unit 119 constantly monitors whether or not an estimation error has occurred on the basis of information indicating the amount of data of the downlink signal of the wireless communication system. The estimation error detection unit 119 detects an estimation error on the basis of whether or not the downlink signal of the wireless communication system has been transmitted during a signal transmission period of the wireless communication system. The estimation error detection unit 119 constantly monitors whether or not an estimation error has occurred. If the downlink signal of the wireless communication system is transmitted during the signal transmission period of the wireless communication system, the estimation error detection unit 119 determines that an estimation error has occurred. If the estimation error detection unit 119 detects that an estimation error has occurred, the estimation error detection unit 119 transmits estimation error information to the bandwidth allocation calculation unit 120.

Figure 8:
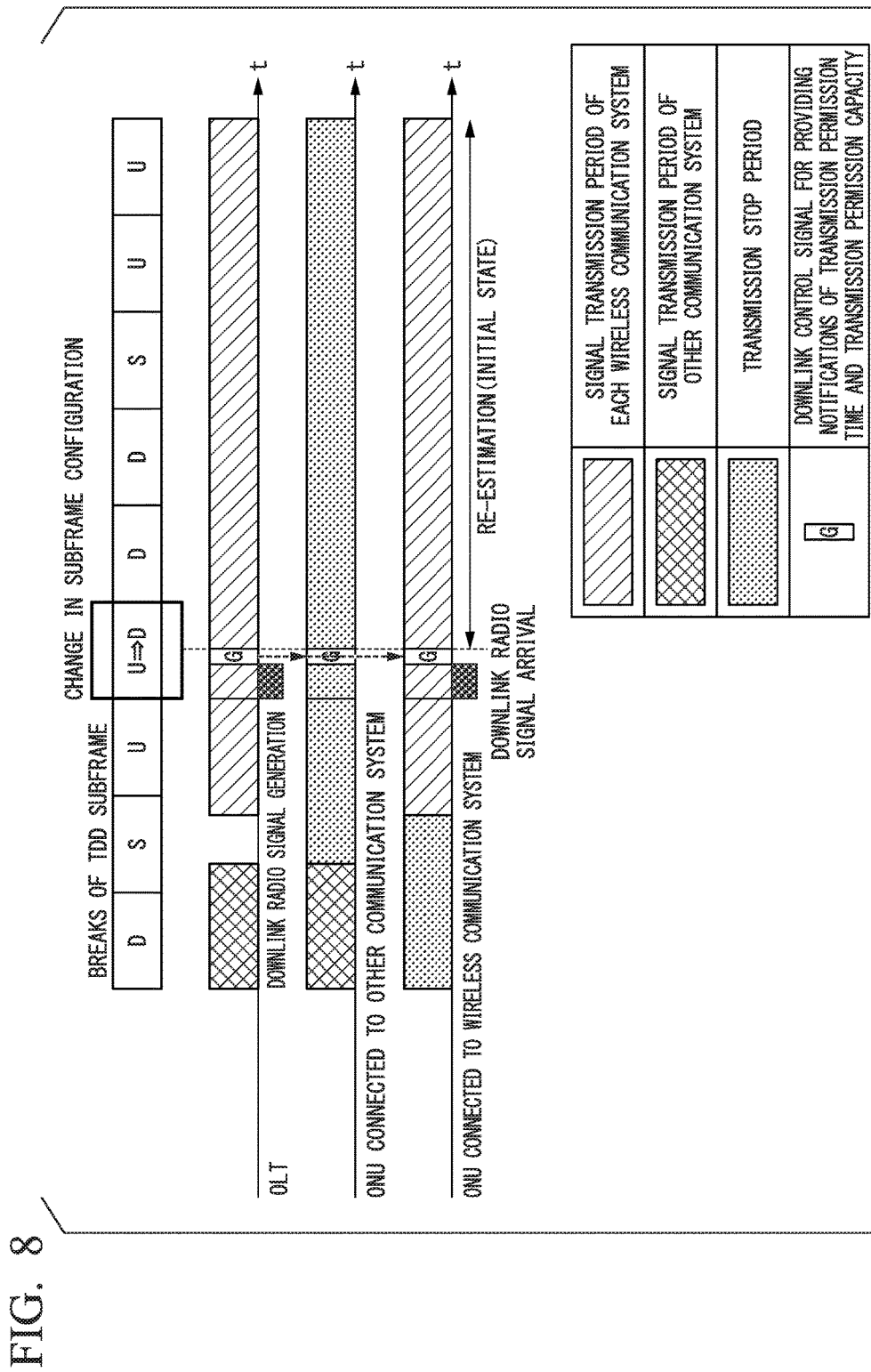
FIG. 8 is a time chart showing an example of traffic in the third embodiment.

FIG. 8 is a time chart showing an example of traffic in the third embodiment. The horizontal axis represents time. A first row from the top shows breaks of the configuration of the TDD subframe. A second row from the top shows a period during which the OLT 110c acquires a signal. A third row from the top shows a period during which an ONU 13-3 or 13-4 transmits a signal and a period during which the ONU 13-3 or 13-4 stops the transmission of the signal. A fourth row from the top shows a period during which an ONU 13-1 or 13-2 transmits a signal and a period during which the ONU 13-1 or 13-2 stops the transmission of the signal.

In the example shown in FIG. 8, allocation to some TDD subframes has been changed from uplink subframes to downlink subframes. The OLT 110c transmits a downlink signal of the wireless communication system during the signal transmission period. The downlink signal processing unit 113 transmits bandwidth allocation information as a GATE signal to the ONU 13-1.

As described above, if the relay unit relays the downlink signal during the signal transmission period of the wireless communication system, the estimation error detection unit 119 of the third embodiment determines that the estimation of a timing of the transmission stop period is erroneous. When it is determined that there is an error in the estimation, the OLT 110c returns the bandwidth allocation to the initial state, and then allocates a bandwidth on the basis of a newly estimated transmission stop period.

Thereby, the network system 100 (a transmission system) of the third embodiment configured to accommodate a communication line of a communication system for performing communication according to TDD and a communication line of another communication system can minimize a delay occurring in a signal of a communication system even when an estimation error occurs in a configuration of the signal of the communication system.

Fourth Embodiment

A fourth embodiment is different from the first to third embodiments in that a cycle of dynamic bandwidth allocation (hereinafter referred to as a "DBA cycle") is initialized. An OLT 11 may be any one of the OLT 110a described in the first embodiment, the OLT 110b shown in the second embodiment, and the OLT 110c shown in the third embodiment. In the fourth embodiment, as an example, only differences from the second embodiment will be described.

The OLT 110b allocates a bandwidth to a signal of an ONU 13 in the DBA cycle. If the OLT 110b returns a setting of signal bandwidth allocation to the ONU 13 to an initial state, the ONU 13 validates the bandwidth allocation setting at a timing at which the next DBA period starts. Thus, if the timing at which the DBA cycle starts is not initialized (reset), a time at which the ONU 13 transmits an uplink signal is delayed. That is, if the timing of the DBA period is not initialized, a transmission delay due to a delay of the DBA cycle occurs. The OLT 110b initializes a timing of the DBA cycle so that no transmission delay is caused by the delay of the DBA cycle. That is, the OLT 110b updates a timing at which the bandwidth is allocated so that no transmission delay is caused by the delay of the DBA cycle.

Figure 9:
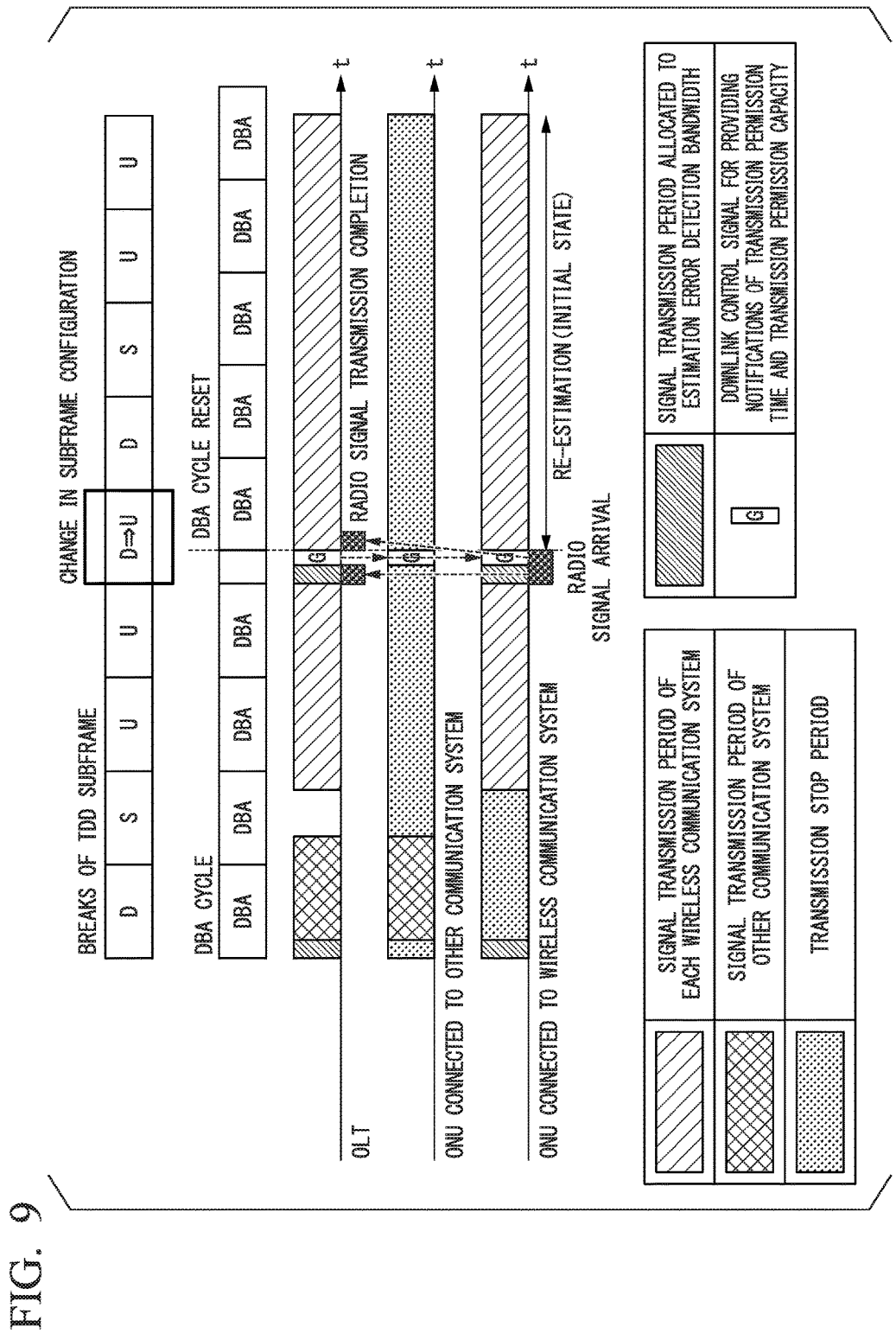
FIG. 9 is a time chart showing an example of traffic in a fourth embodiment.

FIG. 9 is a time chart showing an example of traffic in the fourth embodiment. The horizontal axis represents time. A first row from the top shows breaks of the configuration of the TDD subframe. A second row from the top shows breaks of a DBA cycle. A third row from the top shows a period during which a signal is acquired by the OLT 110b. A fourth row from the top shows a period during which an ONU 13-3 or 13-4 transmits a signal and a period during which the ONU 13-3 or 13-4 stops the transmission of the signal. A fifth row from the top shows a period during which an ONU 13-1 or 13-2 transmits a signal and a period during which the ONU 13-1 or 13-2 stops the transmission of a signal.

In the example shown in FIG. 9, allocation to some TDD subframes is changed from downlink subframes to uplink subframes. A detection period is allocated during a period in which a configuration of a TDD subframe is changed. The OLT 110b acquires an uplink signal of the wireless communication system during the detection period. The downlink signal processing unit 113 of the OLT 110b initializes a timing of a DBA cycle. The downlink signal processing unit 113 of the OLT 110b transmits information indicating a timing of a signal transmission period and bandwidth allocation information as a GATE signal to the ONU 13. The ONU 13-1 or 13-2 transmits an uplink signal during the signal transmission period of the wireless communication system.

A TDD frame information estimation unit of a TDD information estimation unit 122 may estimate the configuration of the TDD subframe after the downlink signal processing unit 113 initializes a timing of the DBA cycle. The downlink signal processing unit 113 may initialize the timing of the DBA cycle according to a timing at which a configuration of the TDD subframe (a TDD subframe pattern) is switched. Thereby, the downlink signal processing unit 113 can cause a switching time of the configuration of the TDD subframe to match a timing (a start time or an end time) of the DBA cycle.

Figure 10:
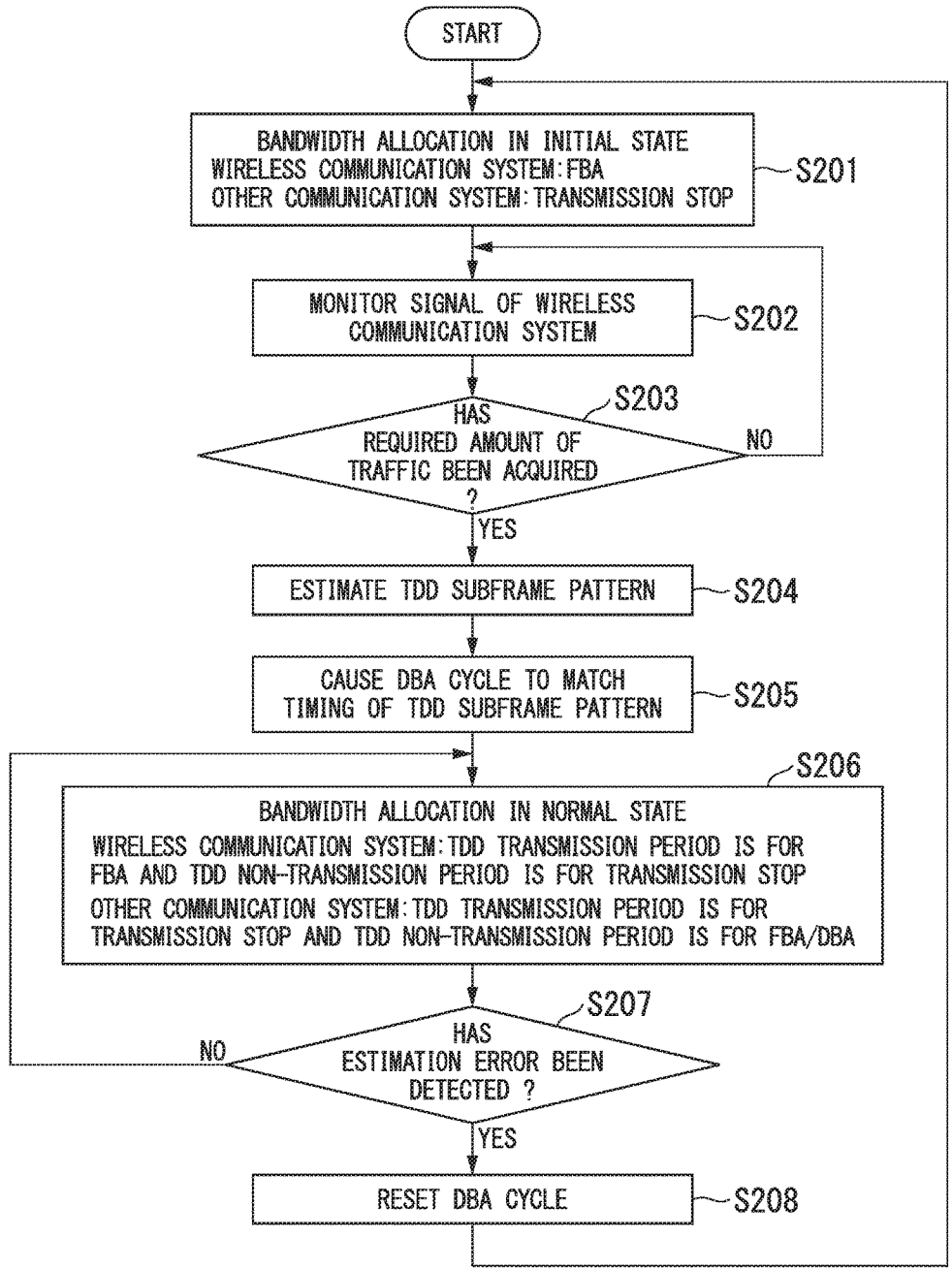
FIG. 10 is a flowchart showing an example of an operation of an OLT in the fourth embodiment.

FIG. 10 is a flowchart showing an example of an operation of the OLT in the fourth embodiment. The bandwidth allocation unit 121 transmits the bandwidth allocation information to the ONU 13 via the downlink signal processing unit 113. In the initial state, the bandwidth allocation unit 121 allocates a bandwidth to an uplink signal of the wireless communication system according to FBA. In the initial state, the bandwidth allocation unit 121 stops the transmission of the signal of the other communication system (step S201). The traffic amount extraction unit 118 monitors the uplink signal of the wireless communication system (step S202).

The TDD information estimation unit 122 determines whether or not a signal having a required amount of traffic or more has been acquired (step S203). If the TDD information estimation unit 122 has not acquired a signal having a required amount of traffic or more (step S203: NO), the traffic amount extraction unit 118 returns the process to step S202. If the TDD information estimation unit 122 has acquired a signal having a required amount of traffic or more (step S203: YES), the TDD information estimation unit 122 estimates a configuration of a TDD subframe (step S204).

The downlink signal processing unit 113 causes a timing of the DBA cycle to match a timing at which the configuration of the TDD subframe (a TDD subframe pattern) is switched (step S205).

In the normal state, the TDD information estimation unit 122 allocates a bandwidth to the uplink signal of the wireless communication system according to FBA during the TDD transmission period. In the normal state, the TDD information estimation unit 122 stops the transmission of the uplink signal of the wireless communication system during a TDD non-transmission period.

In the normal state, the TDD information estimation unit 122 stops the transmission of the signal of the other communication system during the TDD transmission period. In the normal state, the TDD information estimation unit 122 allocates the bandwidth to the signal of the other communication system according to FBA or DBA during the TDD non-transmission period (step S206).

It is determined whether or not an estimation error has occurred (step S207). If an estimation error has occurred (step S207: YES), the downlink signal processing unit 113 initializes a timing of the DBA cycle according to a timing at which a configuration of the TDD subframe (a TDD subframe pattern) is switched (step S208). The bandwidth allocation unit 121 returns the process to step S201. If an estimation error has not occurred (step S207: NO), the bandwidth allocation unit 121 returns the process to step S206.

As described above, when it is detected that the estimation of the transmission stop period is erroneous, the bandwidth allocation unit 121 of the fourth embodiment updates a timing at which a bandwidth is allocated to the uplink signal (a timing at which the DBA cycle starts).

Thereby, the network system 100 (a transmission system) of the fourth embodiment configured to accommodate a communication line of a communication system for performing communication according to TDD and a communication line of another communication system can minimize a propagation delay occurring in a signal of a communication system to a propagation delay due to optical fibers 51 and 52 even when an estimation error occurs in a configuration of the signal of the communication system.

Fifth Embodiment

A fifth embodiment is different from the first to fourth embodiments in that bandwidth allocation information in an initial state is stored in a memory. In the fifth embodiment, as an example, only differences from the second embodiment will be described.

Figure 11:
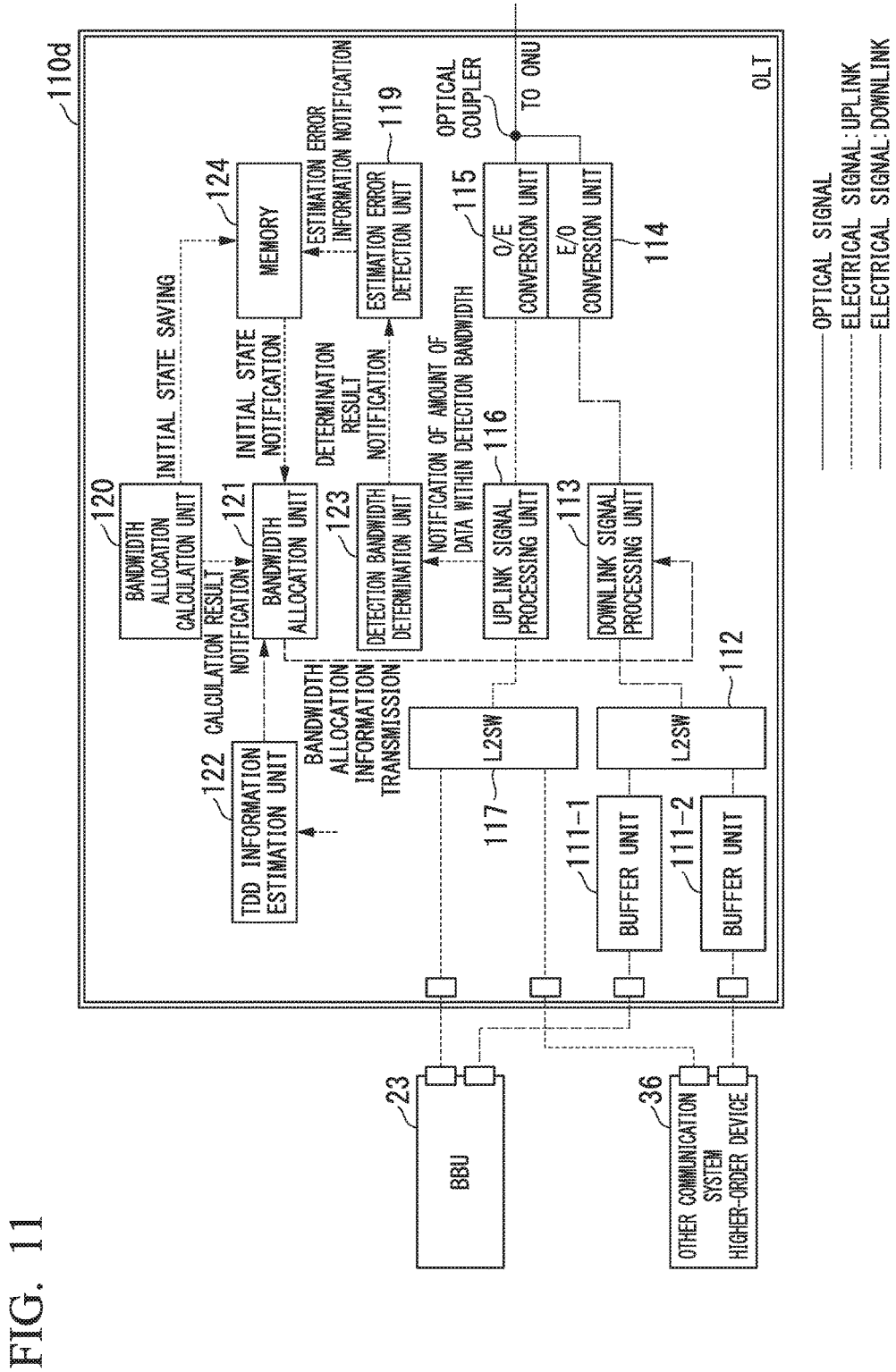
FIG. 11 is a block diagram showing an example of a configuration of an OLT in a fifth embodiment.
Figures 12, 13:
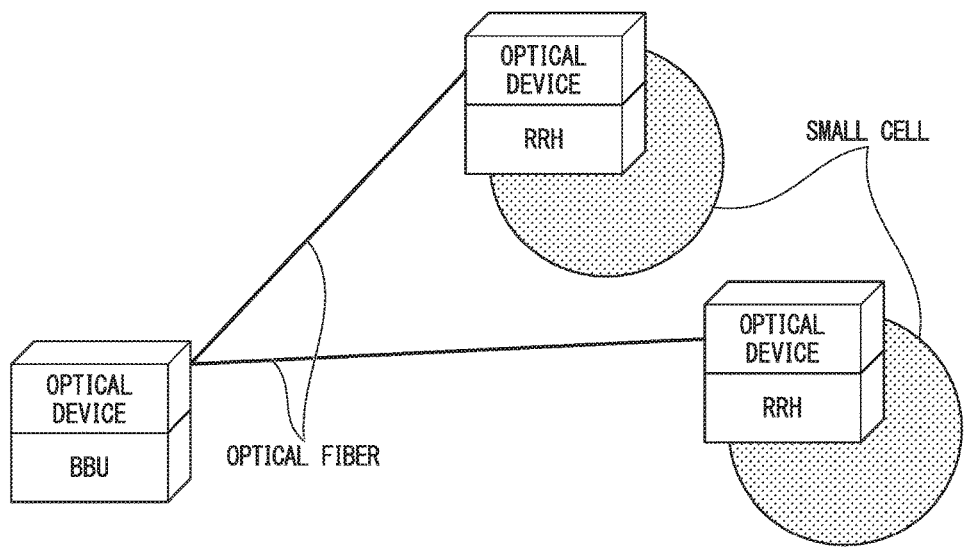
FIG. 12 is a diagram showing an example of a configuration of a mobile fronthaul in the conventional technology.
FIG. 13 is a diagram showing a TDD frame configuration of LTE in the conventional technology.
Figure 14:
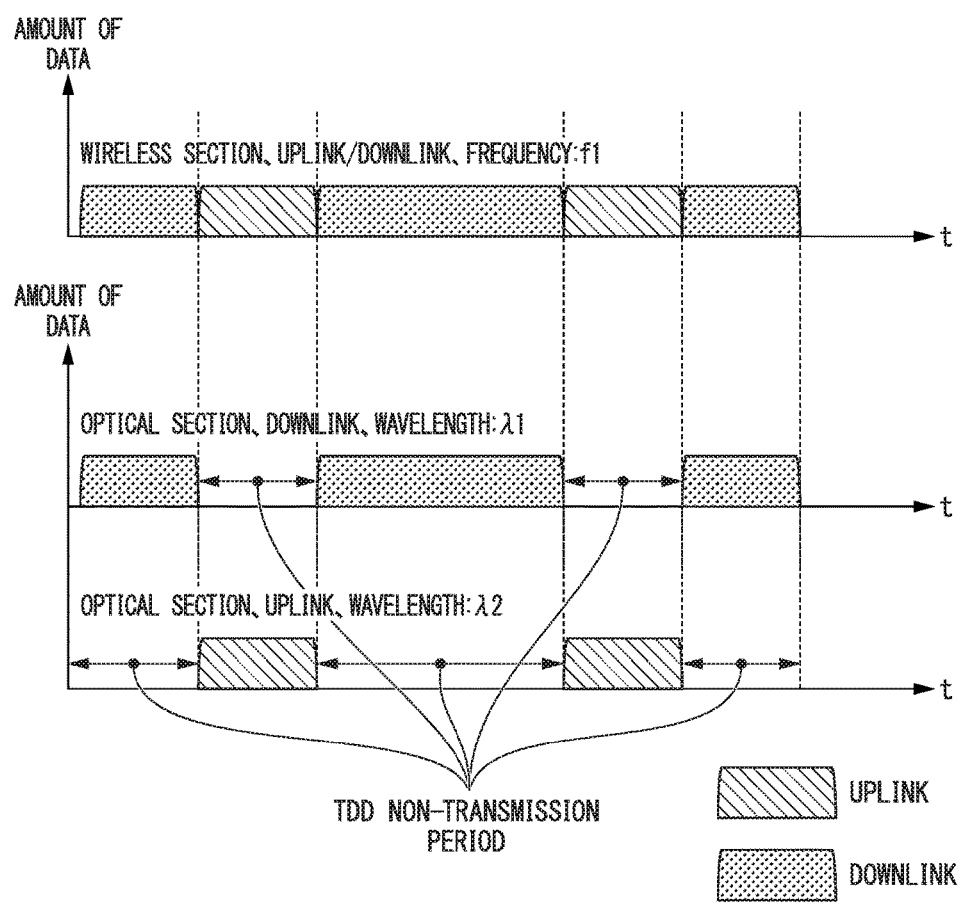
FIG. 14 is a diagram showing an example of band width utilization in a wireless section and an optical section in a mobile fronthaul when a wireless base station of a TDD scheme is accommodated in the conventional technology.
Figure 15:
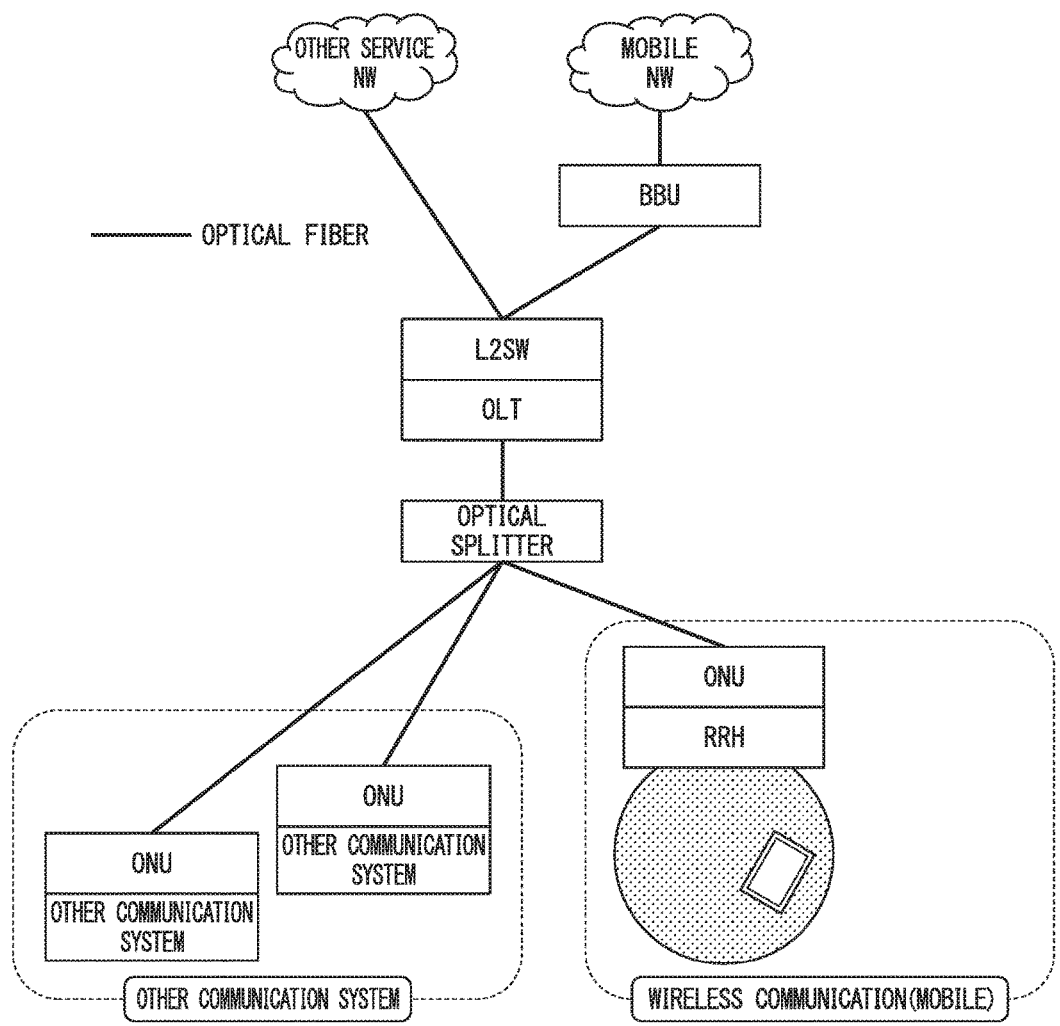
FIG. 15 is a diagram showing an example of a network system using a PON in the optical section in the conventional technology.

FIG. 11 is a diagram showing an example of a configuration of an OLT 110*d* in the fifth embodiment. The OLT 110*d* is the OLT 11 shown in FIG. 1. Also, the OLT 110*d* may be an external device connected to the OLT 11.

The OLT 110*d* includes a buffer unit 111-1, a buffer unit 111-2, an L2SW 112, a downlink signal processing unit 113, an E/O conversion unit 114, an O/E conversion unit 115, an uplink signal processing unit 116, an L2SW 117, an estimation error detection unit 119, a bandwidth allocation calculation unit 120, a bandwidth allocation unit 121, a TDD information estimation unit 122, a detection bandwidth determination unit 123, and a memory 124. The memory 124 is configured using a storage device having a non-volatile memory (a non-transitory recording medium) such as a magnetic hard disk device or a semiconductor storage device.

The estimation error detection unit 119 causes the memory 124 to store estimation error information. The bandwidth allocation calculation unit 120 causes the memory 124 to store the bandwidth allocation information in the initial state. If the estimated error information is acquired from the memory 124, the bandwidth allocation unit 121 acquires the bandwidth allocation information in the initial state from the memory 124. That is, if the estimation error detection unit 119 detects an estimation error, the bandwidth allocation unit 121 acquires the bandwidth allocation information in the initial state from the memory 124. If the estimation error detection unit 119 detects the estimation error, the bandwidth allocation unit 121 transmits the bandwidth allocation information in the initial state acquired from the memory 124 to an ONU 13 via the downlink signal processing unit 113.

As described above, the bandwidth allocation unit 121 transmits the bandwidth allocation information in the initial state acquired from the memory 124 to the ONU 13 via the downlink signal processing unit 113 if the estimation error detection unit 119 detects the estimation error. Thereby, a network system 100 (a transmission system) of the fifth embodiment does not need to re-calculate bandwidth allocation so as to cause the bandwidth allocation to transition to the initial state. The network system 100 of the fifth embodiment can reduce a transmission delay due to processing such as transmission order control.

Sixth Embodiment

A sixth embodiment is different from the first to fifth embodiments in that the OLT 11 includes a functional unit that does not transition to an initial state even when an estimation error detection unit 119 detects an estimation error. In the sixth embodiment, only differences from the first embodiment will be described.

If the estimation error detection unit 119 detects an estimation error, the bandwidth allocation unit 121 allocates a bandwidth to an uplink signal of a wireless communication system according to FBA in a TDD subframe from which an error is detected. If the estimation error detection unit 119 detects an estimation error, the bandwidth allocation unit 121 stops the transmission of a signal of another communication system in the TDD subframe from which the error is detected.

If the estimation error detection unit 119 does not detect an estimation error, the bandwidth allocation unit 121 allocates a bandwidth to the uplink signal of the wireless communication system according to FBA for each TDD subframe during a TDD transmission period. If the estimation error detection unit 119 does not detect an estimation error, the bandwidth allocation unit 121 allocates a bandwidth to a signal of another communication system for each TDD subframe during a TDD non-transmission period according to FBA or DBA.

As described above, if the estimation error detection unit 119 detects an estimation error, the bandwidth allocation unit 121 does not cause other predetermined functional units to transition to the initial state. If the estimation error detection unit 119 detects an estimation error, the bandwidth allocation unit 121 allocates a bandwidth to an uplink signal of the wireless communication system according to FBA in the TDD subframe from which the estimation error is detected. When the estimation error detection unit 119 detects an estimation error, the bandwidth allocation unit 121 stops the transmission of the signal of the other communication system in the TDD subframe from which the estimation error is detected.

Because the network system 100 (a transmission system) of the sixth embodiment does not transition to the initial state even when an estimation error occurs, it is possible to minimize the number of times that the communication of the other communication system is disabled. The network system 100 of the sixth embodiment can reduce an influence on other communication systems.

Also, the first to sixth embodiments may be combined. Thereby, the network system 100 (the transmission system) can increase the accuracy of detection of an estimation error. Also, in the network system 100, an L2SW 33 and an OLT 11 may be configured as one device.

Also, in the first embodiment, instead of detecting an estimation error as the condition for the bandwidth allocation unit 121 to initialize the allocation of the bandwidth, a condition that the estimation error is consecutively detected a predetermined number of times may be used. It is possible to improve the accuracy of detection of the estimation error by determining that the estimation error is occurring on the basis of the fact that the estimation error has been detected a plurality of times consecutively. By improving the detection accuracy, the likelihood that the initialization of bandwidth allocation is erroneously performed is reduced, and relaying of a plurality of communication systems is stably performed.

At least some of the functions of the transmission system and the transmission device in the above-described embodiment may be implemented by a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system or may be implemented using a programmable logic device such as a field programmable gate array (FPGA).

Although embodiments of the present invention have been described above with reference to the drawings, specific configurations are not limited to the embodiments, and design changes, and so on, may also be included without departing from the scope of the present invention.

INDUSTRIAL APPLICABILITY

The present invention can also be applied to a field of application for minimizing a delay caused when an error occurs in estimation for switching of transmission and reception in a first communication system in a system configured to accommodate a communication line of the first communication system for performing communication according to TDD and a communication line of a second communication system.

REFERENCE SIGNS LIST

11 OLT
12 Optical splitter
13 ONU
21 Mobile wireless terminal
22 RRH
23 BBU
24 Mobile NW
31 Other communication system
32 Other communication system
33 Layer 2 switch (L2SW)
34 Other service NW
36 Other communication system higher-order device
51 Optical fiber
52 Optical fiber
100 Network system
110a OLT
110b OLT
110c OLT
110d OLT
111 Buffer unit (relay unit)
112 L2SW (relay unit)
113 Downlink signal processing unit (relay unit)
114 E/O conversion unit (relay unit)
115 O/E conversion unit (relay unit)
116 Uplink signal processing unit (relay unit)
117 L2SW (relay unit)
118 Traffic amount extraction unit
119 Estimation error detection unit
120 Bandwidth allocation calculation unit
121 Bandwidth allocation unit
122 TDD information estimation unit
123 Detection bandwidth determination unit
124 Memory

The invention claimed is:

1. A transmission system, which accommodates a communication line of a first communication system for performing communication according to time division duplex (TDD) and a communication line of a second communication system, the transmission system comprising:
 a relay unit configured to relay uplink signals and downlink signals in the first and second communication systems;
 a TDD information estimation unit configured to estimate a transmission stop period during which no uplink signal of the first communication system is transmitted;
 an estimation error detection unit configured to detect that the estimation of the transmission stop period is erroneous on the basis of the uplink signal or the downlink signal of the first communication system; and
 a bandwidth allocation unit configured to prioritize allocation of a bandwidth in the relay unit for the uplink signal of the first communication system over allocation of a bandwidth in the relay unit for the uplink signal of the second communication system if the estimation of the transmission stop period is erroneous.

2. The transmission system according to claim 1,
 wherein the bandwidth allocation unit allocates a detection bandwidth for relaying the uplink signal of the first communication system during the transmission stop period, and
 wherein the estimation error detection unit determines that there is an error in the estimation of the transmission stop period if the uplink signal of the first communication system is received by the relay unit in the detection bandwidth.

3. The transmission system according to claim 1, wherein the estimation error detection unit determines that there is an error in the estimation of the transmission stop period if the downlink signal of the first communication system is received by the relay unit during a period other than the transmission stop period.

4. The transmission system according to claim 1,
wherein the bandwidth allocation unit performs allocation of a bandwidth to the uplink signal of the first communication system every predetermined cycle, and
wherein the bandwidth allocation unit updates a timing at which the cycle starts when the estimation error detection unit determines that there is an error in the estimation of the transmission stop period.

5. The transmission system according to claim 1, wherein the estimation error detection unit determines that there is an error in the estimation of the transmission stop period if an amount of traffic in an uplink of the first communication system periodically increases or decreases.

6. A transmission method for use in a transmission system, which accommodates a communication line of a first communication system for performing communication according to TDD and a communication line of a second communication system, the transmission method comprising the steps of:
relaying uplink signals and downlink signals in the first and second communication systems;
estimating a transmission stop period during which no uplink signal of the first communication system is transmitted;
detecting that the estimation of the transmission stop period is erroneous on the basis of the uplink signal or the downlink signal of the first communication system; and
prioritizing allocation of a bandwidth in the relaying for the uplink signal of the first communication system over allocation of a bandwidth in the relaying for the uplink signal of the second communication system if it is detected that the estimation of the transmission stop period is erroneous.

7. A transmission device, which accommodates a communication line of a first communication system for performing communication according to TDD and a communication line of a second communication system, the transmission device comprising:
a relay unit configured to relay uplink signals and downlink signals in the first and second communication systems;
a TDD information estimation unit configured to estimate a transmission stop period during which no uplink signal of the first communication system is transmitted;
an estimation error detection unit configured to detect that the estimation of the transmission stop period is erroneous on the basis of the uplink signal or the downlink signal of the first communication system; and
a bandwidth allocation unit configured to prioritize allocation of a bandwidth in the relay unit for the uplink signal of the first communication system over allocation of a bandwidth in the relay unit for the uplink signal of the second communication system if the estimation of the transmission stop period is erroneous.

* * * * *